(12) United States Patent
McKenna et al.

(10) Patent No.: US 11,875,103 B2
(45) Date of Patent: Jan. 16, 2024

(54) MANAGING LINKS FOR TRACKING USER INTERACTIONS WITH CONTENT ITEMS

(71) Applicant: Intercom, Inc., San Francisco, CA (US)

(72) Inventors: Peter McKenna, Dublin (IE); Paul Magrath, Dublin (IE)

(73) Assignee: Intercom, Inc., San Francisco, CA (US)

( * ) Notice: Subject to any disclaimer, the term of this patent is extended or adjusted under 35 U.S.C. 154(b) by 0 days.

(21) Appl. No.: 17/973,390

(22) Filed: Oct. 25, 2022

(65) Prior Publication Data
US 2023/0126482 A1    Apr. 27, 2023

Related U.S. Application Data

(60) Provisional application No. 63/271,949, filed on Oct. 26, 2021.

(51) Int. Cl.
*G06F 40/134* (2020.01)
*H04L 67/50* (2022.01)

(52) U.S. Cl.
CPC .......... *G06F 40/134* (2020.01); *H04L 67/535* (2022.05)

(58) Field of Classification Search
CPC .............................. G06F 40/134; H04L 67/535
See application file for complete search history.

(56) References Cited

U.S. PATENT DOCUMENTS

| | | | | |
|---|---|---|---|---|
| 7,970,891 | B1* | 6/2011 | Kontothanssis | G06F 16/9566 709/224 |
| 2005/0044139 | A1* | 2/2005 | Christian | H04L 67/34 709/246 |
| 2012/0046960 | A1* | 2/2012 | Salta | G06Q 50/01 705/1.1 |
| 2013/0036374 | A1* | 2/2013 | Melamed | G06F 3/04812 715/760 |
| 2015/0081419 | A1* | 3/2015 | Strutton | H04L 51/52 705/14.41 |
| 2016/0042388 | A1* | 2/2016 | Chater | H04L 67/535 705/14.45 |
| 2021/0383059 | A1* | 12/2021 | Schultz | G06F 40/14 |

* cited by examiner

*Primary Examiner* — Asher D Kells
(74) *Attorney, Agent, or Firm* — Womble Bond Dickinson (US) LLP

(57) ABSTRACT

A system and method of managing links for tracking user interactions with content items. The method includes generating, by a processing device, a banner message comprising a content item, wherein the content item comprises one or more links, each link associated with a respective internet address. The method includes scanning the content item to identify at least one link of the one or more links. The method includes extracting the at least one link of the one or more links from the banner message. The method includes generating a tracking link based on the extracted link. The method includes generating an updated banner message based on the tracking link. The method includes sending the updated banner message to a client device to cause the client device to present the updated banner message on a display associated with the client device.

18 Claims, 23 Drawing Sheets

| MODEL | Banners::Models::Banner | |
|---|---|---|
| KEY | TYPE | DESCRIPTION |
| app_id | App Belongs to: | A banner belongs to an App. |
| action_target | enum | Whether to perform the banner action in the same window or a new window (if applicable). One of:<br>• Self (Same window)<br>• Blank (New window) |
| action | Enum<br>(Default: Open a URL) | The type of banner action. One of:<br>• No action<br>• Open a URL<br>• Open an article/bot/tour<br>• Start a conversation<br>• Collect an email<br>• Reaction |
| dismisses_on_action | Boolean | Whether to dismiss the banner when the action is completed. |
| position | Enum (Default: Top) | Where the banner is positioned. One of:<br>• Top<br>• Bottom |
| reaction_set | Array[String] | The set of reactions that end users can choose from |
| style | Enum<br>(Default: Inline) | What style of banner to display. One of:<br>• Inline<br>• Floating |
| created_at | timestamp | When the banner was created |
| updated_at | timestamp | When the banner was last updated |

| MODEL | Banners::Models::LocalizedBannerContent | |
|---|---|---|
| KEY | TYPE | DESCRIPTION |
| app_id | Belongs to: App | A localized banner content belongs to an App. |
| banner_id | Belongs to: App | A localized banner object belongs to a Banner. |
| locale | String | The locale of the localized banner content. |
| action_title | String (default empty string) | The label of the banner button, if any. |
| action_content_id | Integer | The ID of the article, bot or tour to open. May be null |
| action_content_type | Integer (As defined in EntityTypes) | Whether to open an article, bot or tour. May be null |
| action_href | String | The URL to open. May be null |
| assign_to_id | | Who to assign conversations created from |

1600

| MODEL | Banners::Models::LocalizedBannerContent | |
|---|---|---|
| | Assignee (default) Unknown Admin (-1) | Assignee this banner to. |
| assign_to_type | Enum (default) Standard assignee (Assignee) | Whether to assign conversations created from this banner to the owner. One of:<br>• Standard assignee<br>• Assign to owner |
| json_blocks | Array[Block] | The content blocks of the banner |
| sender_id | Belongs to: Assignee (default) Unknown Admin (-1) | Who to show as the sender of the banner (i.e. in the avatar image to the left of the banner blocks in the rendered banner)<br>If the sender is set to unknown, we won't show an avatar image. |
| sender_type | Enum (default) Standard sender (Sender) | Whether to assign conversations created from this banner to the owner. One of:<br>• Standard sender<br>• Send from to owner |
| created_at | Timestamp | When the localized banner content was created |
| updated_at | Timestamp | When the localized banner content was last updated |

FIG. 16B

| MODEL | Banners::Private::Models::BannerView | |
|---|---|---|
| KEY | TYPE | DESCRIPTION |
| app_id | Belongs to: App | The App which the banner and the user belong to. |
| banner_id | Belongs to: App | The banner which was viewed |
| company_id | Belongs to: Company | The company for which the banner was viewed, if the match was a company match. The default company ID ("-1") otherwise. |
| user_id | Belongs to: user | The user who viewed the banner. |
| dismissed | Boolean | Whether the banner has been dismissed. |
| selected_reaction | String | Which reaction the user picked from the reaction set, if any. |
| created_at | Timestamp | When the localized banner content was created |
| updated_at | Timestamp | When the localized banner content was last updated |

FIG. 17

| MODEL | ContentLink | |
|---|---|---|
| KEY | TYPE | DESCRIPTION |
| app_id | Belongs to: App | The workspace (App) of the MessageVariation. |
| url | Text | The URL of the link. |
| link_type | enum (Default unknown) | One of four types:<br>• Unknown<br>• Text<br>• Button<br>• Image |
| entity_id | Belongs to: Localized Chat/Post/Email Content | The localized chat/post/email content for which the links were extracted for. Optional (Can be null). |
| entity_type | | |
| message_variation_id | Belongs to: MessageVariation | the MessageVariation from which the links were extracted. Required (Can not be null). |
| created_at | Datetime | |
| updated_at | Datetime | |

| INDEX | ContentLink | USED FOR |
|---|---|---|
| INDEX ON | app_id, entity_type, entity_id | |
| | app_id, message_variation_id | |
| | message_variation_id | |

FIG. 19

| MODEL UPDATE | ContentLink | |
|---|---|---|
| KEY | TYPE | DESCRIPTION |
| message_variation_id | Belongs to: MessageVariation *(Optional)* | The MessageVariation from which the links were extracted. Optional. (Can be null.) |
| | | NB:- Previously Required. |

```
                    ┌─────────────────────────────────────────────┐
                    │ generating a banner message comprising a    │
                    │ content item, wherein the content item      │
                    │ comprises one or more links, each link      │
                    │ associated with a respective internet       │
                    │ address                                     │
                    │                   2102                      │
                    └─────────────────────────────────────────────┘
                                         │
                                         ▼
                    ┌─────────────────────────────────────────────┐
                    │ scanning the content item to identify at    │
                    │ least one link of the one or more links     │
                    │                   2104                      │
                    └─────────────────────────────────────────────┘
                                         │
                                         ▼
                    ┌─────────────────────────────────────────────┐
                    │ extracting the at least one link of the one │
                    │ or more links from the banner message       │
                    │                   2106                      │
                    └─────────────────────────────────────────────┘
                                         │
                                         ▼
                    ┌─────────────────────────────────────────────┐
                    │ generating a tracking link based on the     │
                    │ extracted link                              │
                    │                   2108                      │
                    └─────────────────────────────────────────────┘
                                         │
                                         ▼
                    ┌─────────────────────────────────────────────┐
                    │ generating, by a processing device, an      │
                    │ updated banner message based on the         │
                    │ tracking link                               │
                    │                   2110                      │
                    └─────────────────────────────────────────────┘
                                         │
                                         ▼
                    ┌─────────────────────────────────────────────┐
                    │ sending the updated banner message to a     │
                    │ client device to cause the client device to │
                    │ present the updated banner message on a     │
                    │ display associated with the client device   │
                    │                   2112                      │
                    └─────────────────────────────────────────────┘
```

FIG. 21

MANAGING LINKS FOR TRACKING USER INTERACTIONS WITH CONTENT ITEMS

CROSS-REFERENCE TO RELATED APPLICATIONS

This application claims the benefit of U.S. Provisional Application Ser. No. 63/271,949 entitled "MANAGING LINKS FOR TRACKING USER INTERACTIONS WITH CONTENT ITEMS," filed Oct. 26, 2021, the disclosure of which is incorporated herein by reference in its entirety.

TECHNICAL FIELD

The present disclosure relates generally to software technology, and more particularly, to systems and methods of managing links for tracking user interactions with content items.

BACKGROUND

A graphical user interface (GUI) design principles conform to the model-view-controller software pattern, which separates internal representations of information from the manner in which information is presented to the user, resulting in a platform where users are shown which functions are possible rather than requiring the input of command codes. Users interact with information by manipulating visual widgets, which are designed to respond in accordance with the type of data they hold and support the actions necessary to complete the user's task.

SUMMARY

One aspect disclosed herein is directed to a method of managing links for tracking user interactions with content items. In some embodiments, the method includes generating, by a processing device, a banner message comprising a content item, wherein the content item comprises one or more links, each link associated with a respective internet address. In some embodiments, the method includes scanning the content item to identify at least one link of the one or more links. In some embodiments, the method includes extracting the at least one link of the one or more links from the banner message. In some embodiments, the method includes generating a tracking link based on the extracted link. In some embodiments, the method includes replacing, in the banner message, the extracted link with the tracking link to generate an updated banner message. In some embodiments, the method includes sending the updated banner message to an end user device to cause the end user device to present the updated banner message on a display associated with the end user device. In some embodiments, the method includes detecting a user interaction with the tracking link of the updated banner message via a user interaction message sent by the end user device. In some embodiments, the method includes recording information associated with the user interaction message in a database. In some embodiments, the method includes redirecting, via an internet connection, the end user device to an internet address associated with the tracking link of the updated banner message.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 15 is a table depicting a Banner data model of action metadata for banner messages, according to some embodiments;

FIGS. 16A-B is a table depicting a LocalizedBannerContent data model of action metadata for banner messages, according to some embodiments;

FIG. 17 is a table depicting a BannerView data model used as the instance when recording statistics and tracking the current dismissal state of a banner message, according to some embodiments;

FIG. 18 is a table depicting a ContentLink data model used as the instance when storing information associated with information extracted from blocks of chats, posts, and email, according to some embodiments;

FIG. 19 is a table depicting various options for how the communication system 102 may index the ContentLink data model in FIG. 18, according to some embodiments;

FIG. 20 is a table depicting a modified ContentLink data model used as the instance when storing information associated with information extracted from blocks of chats, posts, and email, according to some embodiments;

FIG. 21 is a flow diagram depicting a method of managing links for tracking user interactions with content items, according to some embodiments.

DETAILED DESCRIPTION

Figure 1:
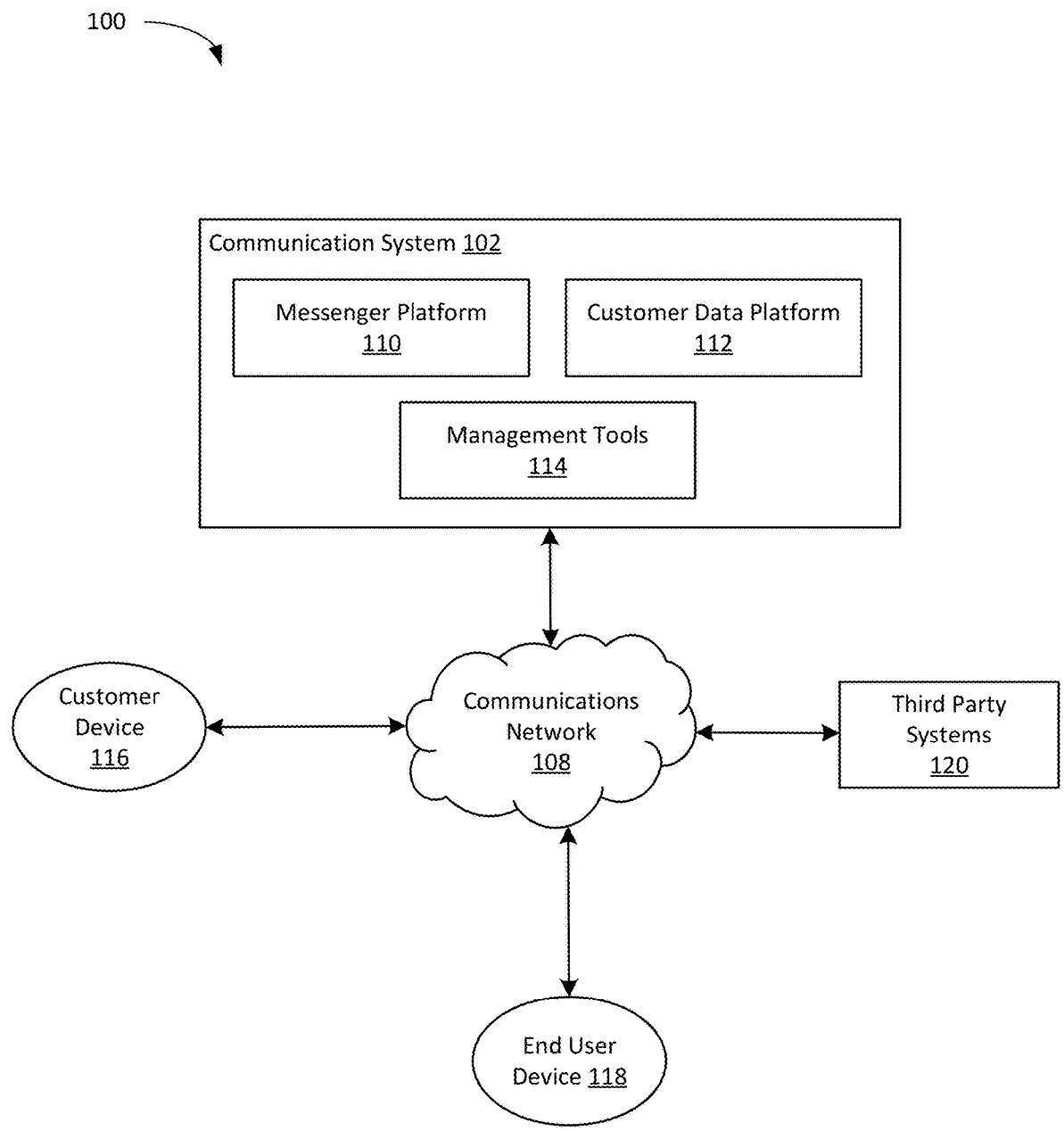
FIG. 1 is a block diagram depicting an example environment for managing communications with users and potential users of a communication system, according to some embodiments.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

As used herein, the term "communication system" may refer to the system and/or program that manages communications between individuals and companies. The term "customer" may refer to a company or organization utilizing the communication system to manage relationships with its end users or potential end users (leads). The term "user" and "end user" may refer to a user (sometimes referred to as, "lead") of an end user device that is interfacing with the customer through the communication system. The term "company" may refer to an organization or business that includes a group of users. The term "engineer" or "developer" may refer to staff managing or programing the communication system.

As described in the below passages, the communication system 102 may place (e.g., assign, allocate) users into user paths developed by the customers and monitors interaction of the users with the customers. The communication system may monitor and/or detect the interaction of the user with the customers. The communication system, in responsive to detecting the interaction of the user with the customer, interact with the users to advance the users along the user paths based on conditions set by the customer. The interactions with the users may include, but not be limited to, chats, instant messages, text messages, and emails. The communication system may include reporting functions that allow a customer to monitor the status of users along the developed user paths.

The conventional graphical user interfaces have several disadvantages. The conventional graphical user interface does not provide a way for customers to show timely, targets and contextual in-product messages (e.g., shown within the graphical user interface) that persist until users have engaged with them without disrupting their flow (e.g., a workflow, a user path, a series). These types of messages are important for driving engagement and action as and when users are ready without seeking to elicit an immediate reaction or response from the users. As a result, the system must repeatedly send duplicate messages to capture the user's attention, which wastes the networking resources (e.g., bandwidth) of the system, and increases networking congestion.

Aspects of the present disclosure address the above-noted and other deficiencies by managing links for tracking user interactions with content items. As discussed in greater detail below, the present disclosure provides a new in-product message type, which provides an unobtrusive, persistent way for customers to target and reach their users for announcements, onboarding, proactive support, website lead generation and more. By capturing the user's attention with a reduced number of networking messages, the embodiments of the present disclosure are further able to avoid a waste of the networking resources, as well as, a reduction (or elimination) of network congestion.

1. Environment for Managing Links and Tracking User Interactions

FIG. 1 is a block diagram depicting an example environment for managing communications with users and potential users of a communication system, according to some embodiments. As shown, the environment 100 includes a communication system 102 that is interconnected with a customer device 116 (sometimes referred to as, a client device), an end user device 118 (sometimes referred to as, a client device), and third party systems 120 via a communications network 108. The communications network 108 may be the internet, a wide area network (WAN), intranet, or other suitable network. The communication system 102 may be hosted on one or more local servers, may be a cloud based system, or may be a hybrid system with local servers and in the cloud. The communication system 102 is maintained by engineers which develop management tools 114 that include an interface or editor for clients of the communication system 102 to interface with the communication system 102.

The communication system 102 includes management tools 114 that are developed to allow customers to develop user series or user paths in the form of nodes and edges (e.g., a connection between nodes) that are stored in a customer data platform 112 of the communication system 102. The communication system 102 includes a messenger platform 110 that interacts with user devices 118 in accordance with the user paths stored in the customer data platform 112.

A customer interacts with the communication system 102 by accessing a customer device 116. The customer device 116 may be a general purpose computer or a mobile device. The customer device 116 allows a customer to access the management tools 114 to develop the user paths stored in the customer data platform 112. For example, the customer device 116 may execute an application using its hardware (e.g., a processor, a memory) to send a request to the communication system 102 for access to a graphical editor, which is an application programming interface (API) stored in the management tools 114. In response to receiving the request, the communication system 102 may send a software package (e.g., executable code, interpreted code, programming instructions, libraries, hooks, data, etc.) to the customer device 116 to cause the customer device 116 to execute the software package using its hardware (e.g., processor, memory). In some embodiments, the application may be a desktop or mobile application, or a web application (e.g., a browser). The customer device 116 may utilize the graphical editor to build the user paths within the graphical editor. The graphical editor may periodically send copies (e.g., snapshots) of the user path as it is being built to the communication system 102, which in turn, stores the user paths to the customer data platform 112. The user paths manage communication of the customer with a user to advance the user through the user paths. The user paths may be developed to increase engagement of a user with the customer via the messenger platform 110.

The messenger platform 110 may interact with a user through an end user device 118 that accesses the communication network 108. The user device 118 may be a general purpose computer or mobile device that access the communication network 108 via the internet or a mobile network. The user may interact with the customer via a website of the customer, a messaging service, or interactive chat. In some embodiments, the user paths may allow a customer to interface with users through mobile networks via messaging or direct phone calls. In some embodiments, a customer may develop a user path in which the communication system 102 interfaces with a user device via a non-conversational channel such as email.

The communication system 102 includes programs or workers that place users into the user paths developed by the customers stored in the customer data platform 112. The communication system 102 may monitor progress of the users through the user paths developed by the customer and interact with the customer based on the nodes and edges developed by the customer for each user path. In some embodiments, the communication system 102 may remove users from user paths based on conditions developed by the customer or by the communication system 102.

The communication system 102 and/or the customers may employ third party systems 120 to receive (e.g., retrieve, obtain, acquire), update, or manipulate (e.g., modify, adjust) the customer data platform 112 or user data which is stored in the customer data platform 112. For example, a customer may utilize a third party system 120 to have a client chat directly with a user or may utilize a bot (e.g., a software program that performs automated, repetitive, and/or pre-defined tasks) to interact with a user via chat or messaging.

Although FIG. 1 shows only a select number of computing devices and/or systems (e.g., communication system 102, customer device 116, third party systems 120, and end user device 118), the environment 100 may include any number of computing devices and/or systems that are interconnected in any arrangement to facilitate the exchange of data between the computing devices and/or systems.

2. Graphical User Interfaces for Generating Links and Recording/Viewing Statics

Figure 2:
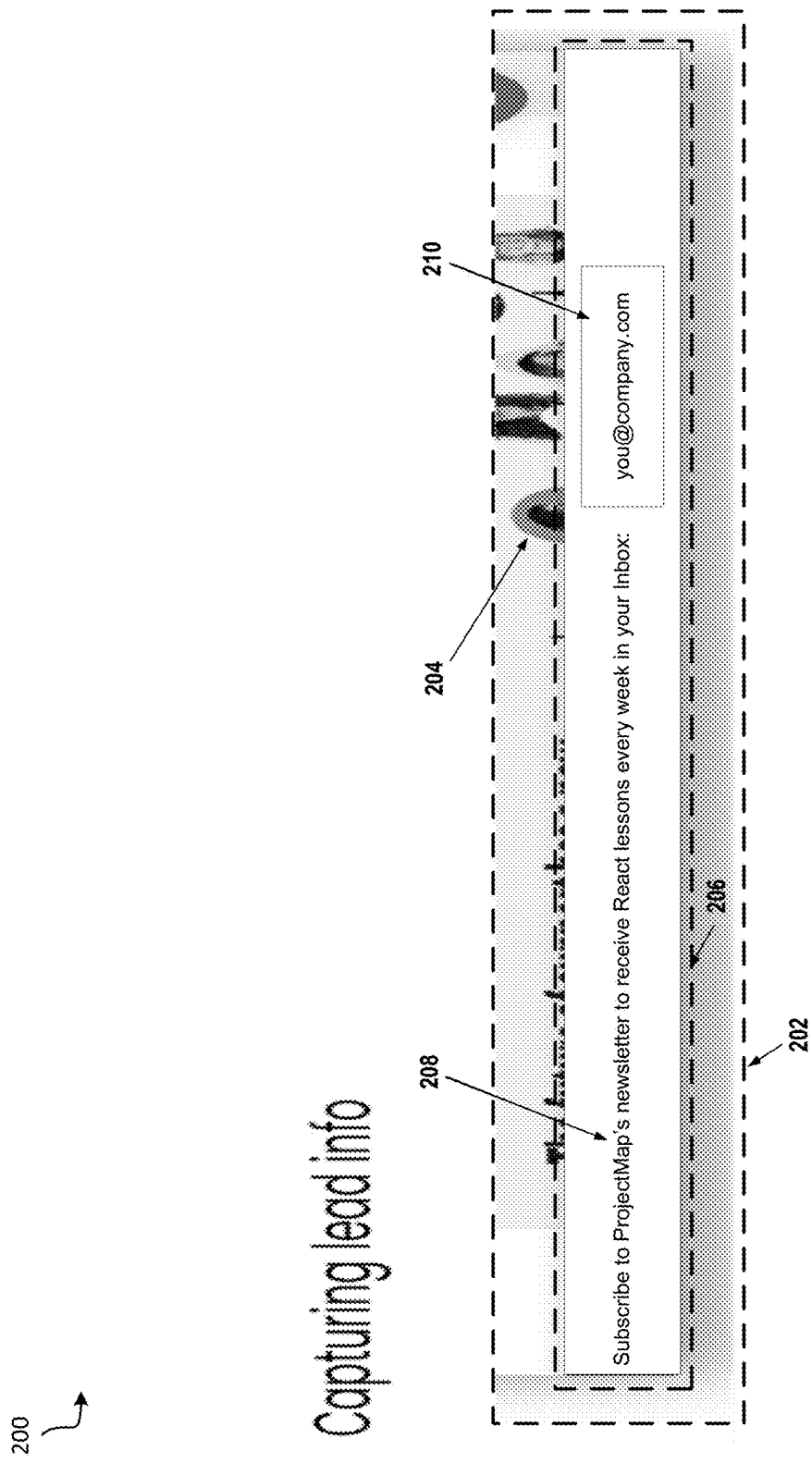
FIG. 2 is a graphical user interface of an example application depicting a method of displaying a banner message for capturing lead information, according to some embodiments.

FIG. 2 is a graphical user interface of an example application depicting a method of displaying a banner message for capturing lead information, according to some embodiments. In some embodiments, the application may be configured to execute on the customer device 116, where the output of the execution is presented on a screen of the customer device 116. In some embodiments, the application may be configured to execute on the communication system 102, where the output of the execution is sent to the customer device 116 via the communication network 108 to cause the customer device 116 to display the output on a screen of the customer device 116. In some embodiments, the application may be a web browser.

As shown in FIG. 2, the application 200 includes a region 202 for displaying a content item 204 and a banner 206. The banner 206 is displayed on top (e.g., hovering, overlapping) over the content item 204. In some embodiments, the banner 206 may be displayed next (e.g., adjacent) to one or more content items 204 such that the banners are not overlapping the one or more content items 204. The banner 206 includes a content item 208 (e.g., "Subscribe to ProjectMap's newsletter to receive React lessons every week in your inbox."). The banner 206 includes an entry field 210 configured to receive information (e.g., user entries) from a user of the application 200.

Figure 3:
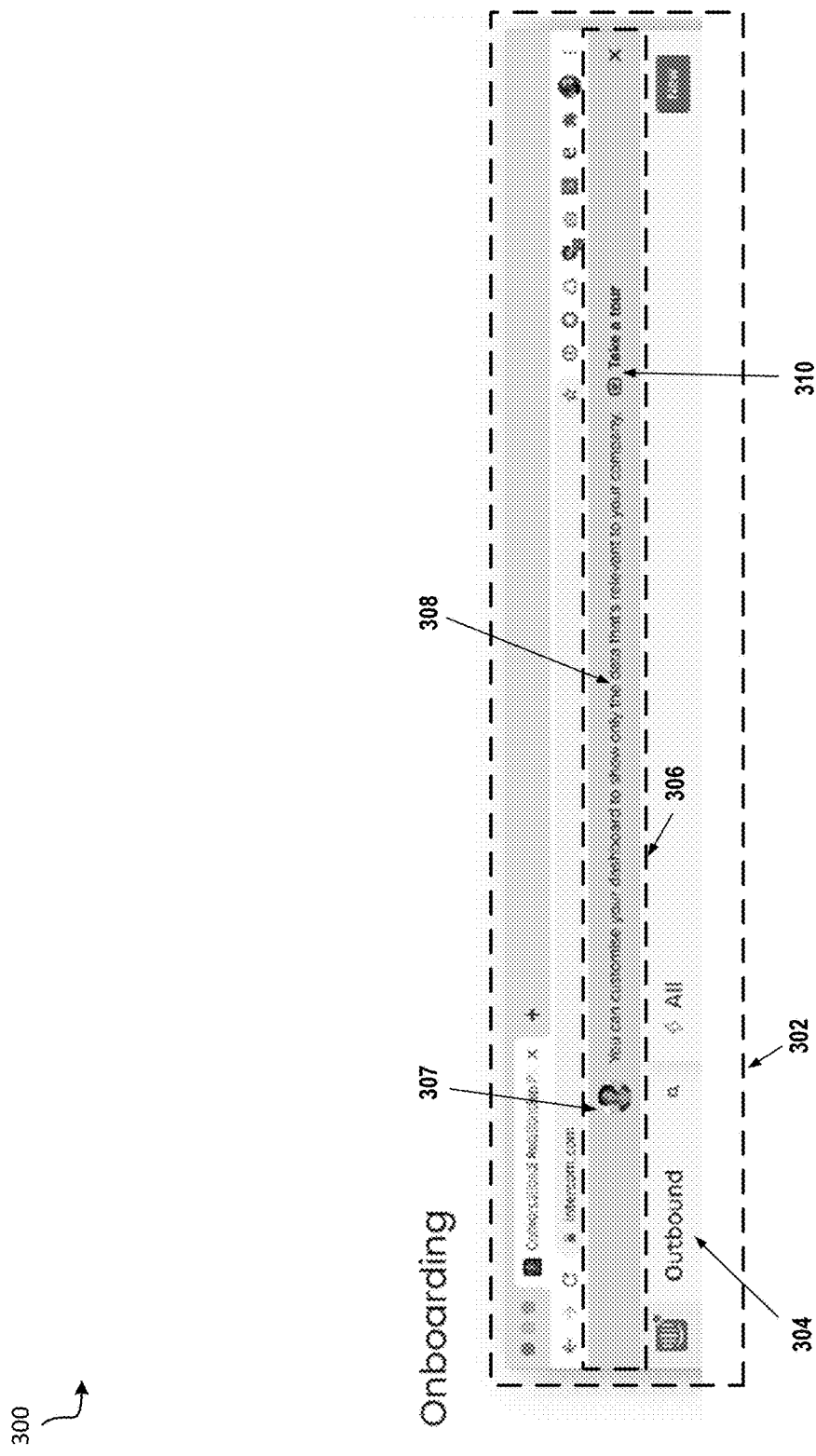
FIG. 3 is a graphical user interface of an example application depicting a method of displaying a banner message for an onboarding experience (e.g., new employee, new member, new user, etc.), according to some embodiments.

FIG. 3 is a graphical user interface of an example application depicting a method of displaying a banner message for an onboarding experience (e.g., new employee, new member, new user, etc.), according to some embodiments. In some embodiments, the application 300 may be configured to execute on the customer device 116, where the output of the execution is presented on a screen of the customer device 116. In some embodiments, the application 300 may be configured to execute on the communication system 102, where the output of the execution is sent to the customer device 116 via the communication network 108 to cause the customer device 116 to display the output on a screen of the customer device 116. In some embodiments, the application 300 may be a web browser.

As shown in FIG. 3, the application 300 includes a region 302 for displaying one or more content items 304 and a banner 306. The banner 306 is displayed next (e.g., adjacent) to content item 304 such that the banners 306 is not overlapping the content item 304. The banner 306 includes an avatar 307. The banner 306 includes a content item 308 (e.g., "You can customise your dashboard to show only the data that's relevant to your company".). The banner 306 includes a link 310 that is associated with an internet address (e.g., URL). In some embodiments, a user may interact with the link 310, for example, by clicking on the link 310, hovering a mouse over the link 310, using a keyboard to highlight the link 310, touching the link 310 via a touchscreen, and/or by using one or more voice commands that identify the link 310 and/or the banner 306. In some embodiments, the link 310 may be configured to cause an end user 118 to send an end user interaction message, responsive to an end user of the end user device 118 interacting with the link 310, to the communication system 102 to indicate that the user interacted with the link 310. In some embodiments, the end user interaction message may include an identifier to the link 310, an internet address (e.g., URL) associated with the link 310, an identifier to the banner message, an identifier to the end user device 118, an identifier to the end user associated with the end user device 118, and/or an identifier to how (e.g., mouse click, hovering mouse over link, etc.) the end user interacted with the link 310.

Figure 4:
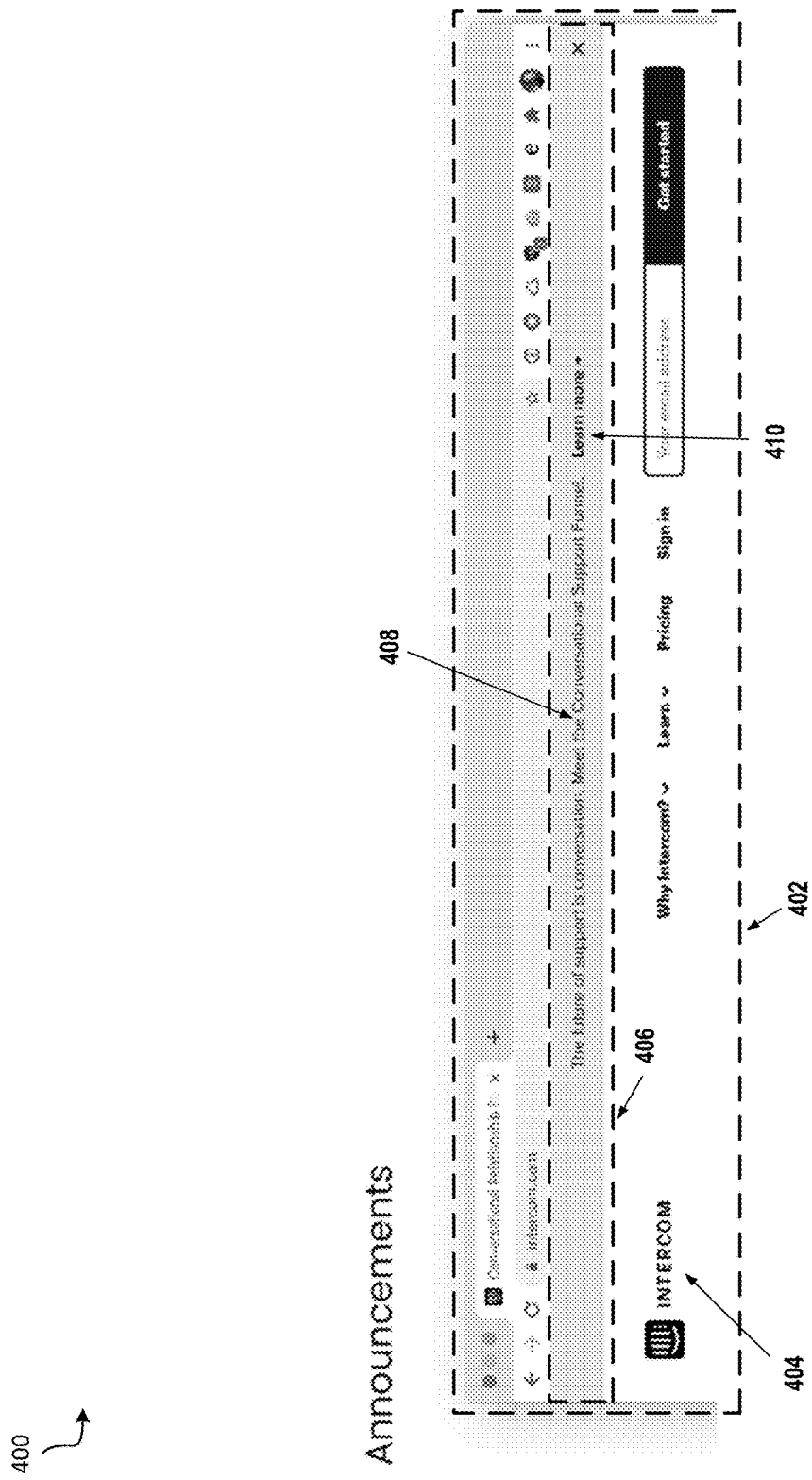
FIG. 4 is a graphical user interface of an example application depicting a method of displaying a banner message for announcements, according to some embodiments.

FIG. 4 is a graphical user interface of an example application depicting a method of displaying a banner message for announcements, according to some embodiments. In some embodiments, the application 400 may be configured to execute on the customer device 116, where the output of the execution is presented on a screen of the customer device 116. In some embodiments, the application 400 may be configured to execute on the communication system 102, where the output of the execution is sent to the customer device 116 via the communication network 108 to cause the customer device 116 to display the output on a screen of the customer device 116. In some embodiments, the application 400 may be a web browser.

As shown in FIG. 4, the application 400 includes a region 402 for displaying a content item 404 and a banner 406. In some embodiments, the banner 406 may be displayed on top (e.g., hovering, overlapping) the one or more content items 404. In some embodiments, the banner 406 may be displayed next (e.g., adjacent) to one or more content items 404 such that the banners are not overlapping the one or more content items 404. In some embodiments, the banner 406 may include a content item 408 (e.g., "The future of support is conversation. Meet the Conversational Support Funnel".). In some embodiments, the banner 406 may include a link 410 that is associated with an internet address (e.g., URL). In some embodiments, a user may interact with the link 410 by, for example, clicking on the link 410, hovering a mouse over the link 410, using a keyboard to highlight the link 410, touching the link 410 via a touchscreen, and/or by using one or more voice commands that identify the link 410 and/or the banner 406. In some embodiments, the link 410 may be configured to cause an end user 118 to send an end user interaction message, responsive to an end user of the end user device 118 interacting with the link 410, to the communication system 102 to indicate that the user interacted with the link 410. In some embodiments, the end user interaction message may include an identifier to the link 410, an internet address (e.g., URL) associated with the link 410, an identifier to the banner message, an identifier to the end user device 118, an identifier to the end user associated with the end user device 118, and/or an identifier to how (e.g., mouse click, hovering mouse over link, etc.) the end user interacted with the link 410.

Figure 5:
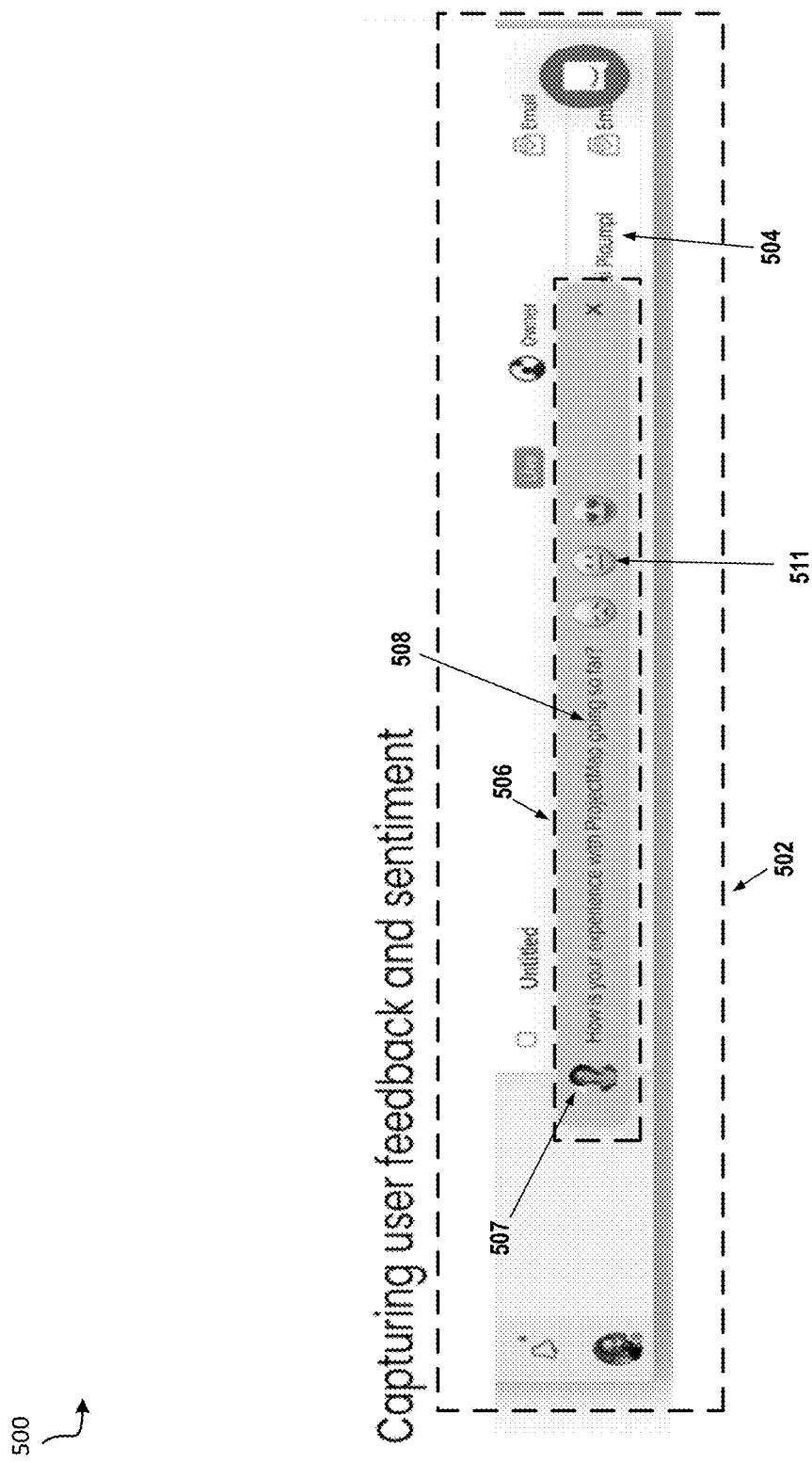
FIG. 5 is a graphical user interface of an example application depicting a method of displaying a banner message for capturing user feedback and sentiment, according to some embodiments.

FIG. 5 is a graphical user interface of an example application depicting a method of displaying a banner message for capturing user feedback and sentiment, according to some embodiments. In some embodiments, the application 500 may be configured to execute on the customer device 116, where the output of the execution is presented on a screen of the customer device 116. In some embodiments, the application 500 may be configured to execute on the communication system 102, where the output of the execution is sent to the customer device 116 via the communication network 108 to cause the customer device 116 to display the output on a screen of the customer device 116. In some embodiments, the application 500 may be a web browser.

As shown in FIG. 5, the application 500 includes a region 502 for displaying a content item 504 and a banner 506. The banner 506 is displayed on top (e.g., hovering, overlapping) the content item 504. In some embodiments, the banner 506 may be displayed next (e.g., adjacent) to one or more content items 504 such that the banners are not overlapping the one or more content items 504. The banner 506 includes a content item 508 (e.g., "How is your experience with ProjectMap going so far?"). The banner 506 includes one or more emojis 511. In some embodiments, the banner 506 may include a link that is associated with an internet address (e.g., URL). In some embodiments, a user may interact with the link 510 by, for example, clicking on the link 510, hovering a mouse over the link 510, using a keyboard to highlight the link 510, touching the link 510 via a touchscreen, and/or by using one or more voice commands that identify the link 510 and/or the banner 506. In some embodiments, the link 510 may be configured to cause an end user 118 to send an end user interaction message, responsive to an end user of the end user device 118 interacting with the link 510, to the communication system 102 to indicate that the user interacted with the link 510. In some embodiments, the end user interaction message may include an identifier to the link 510, an internet address (e.g., URL) associated with the link 510, an identifier to the banner message, an identifier to the end user device 118, an identifier to the end user associated with the end user device 118, and/or an identifier to how (e.g., mouse click, hovering mouse over link, etc.) the end user interacted with the link 510.

Figure 6:
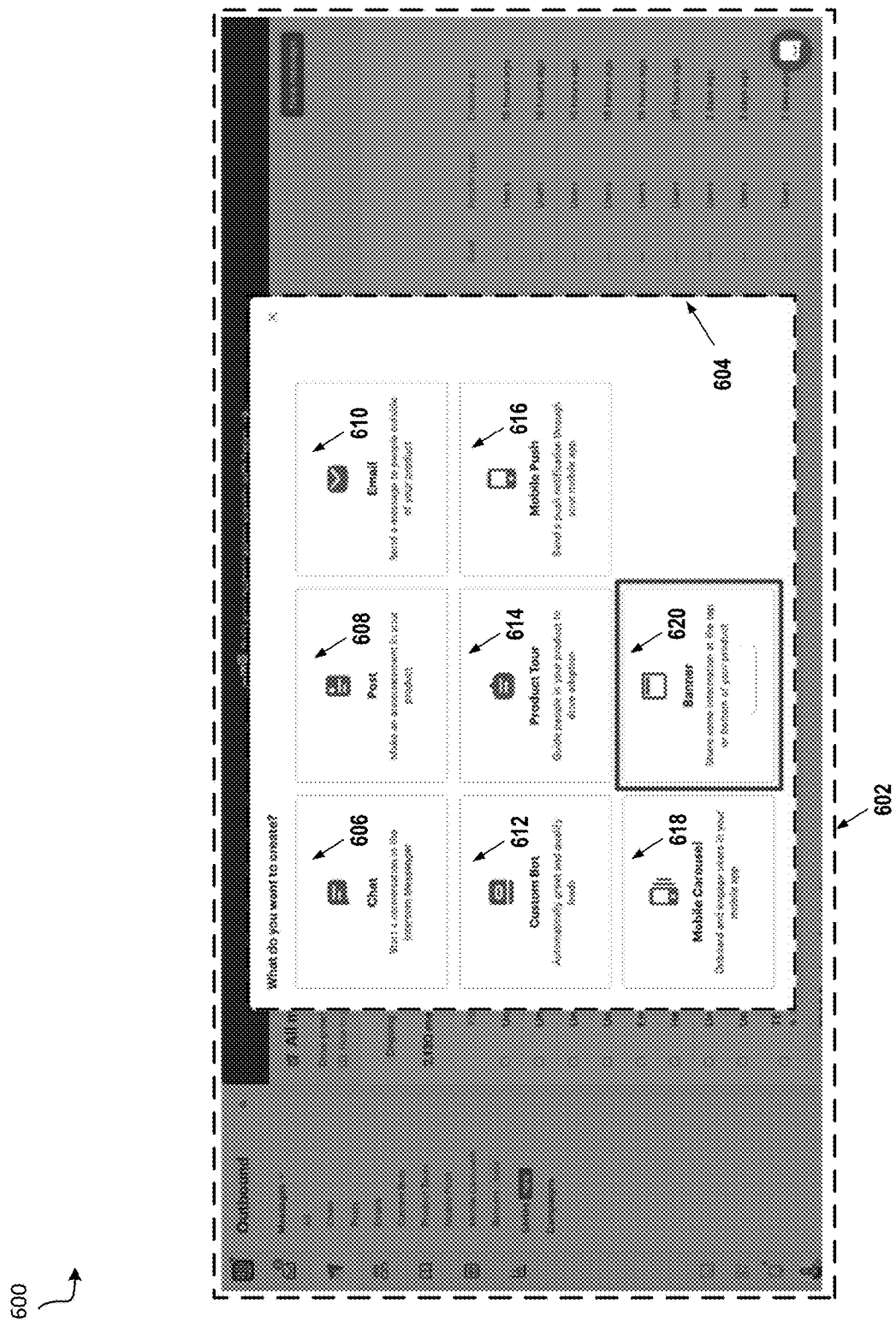
FIG. 6 is a graphical user interface of an example graphical editor depicting a method of building a message type, according to some embodiments.

FIG. 6 is a graphical user interface (GUI) of an example graphical editor (sometimes referred to as, "Messenger Editor") depicting a method of building a message type, according to some embodiments. In some embodiments, the graphical editor may be configured to execute on the customer device 116, where the output of the execution is presented on a screen of the customer device 116. In some embodiments, the graphical editor may be configured to execute on the communication system 102, where the output of the execution is sent to the customer device 116 via the communication network 108 to cause the customer device 116 to display the output on a screen of the customer device 116.

As shown in FIG. 6, the GUI 600 includes a region 602 (sometimes referred to as, "Outbound Home") for displaying a window 604. The window 604 is configured to display a plurality of message types that a customer may select to begin building the selected message type using the graphical editor. A chat message type 606 is presented to an end-user to allows an end-user to start a conversation. A post message type 608 allows a customer to make an announcement to one or more end-users via an in-product channel. An email message type 610 allows a customer to make an announcement to one or more end-users via an out-of-product channel. A custom bot message type 612 automatically greets and qualifies leads (e.g., end-users). A product tour message type 614 is presented to an end-user to guide an end-user in a product to drive adoption of the product by the end-user. A mobile push message type 616 sends a push notification through a mobile application to an end-user. A mobile carousel message type 618 is presented to an end-user in a mobile application to onboard and engage the end-user. A banner message type 620 presents information to an end-user via the product (e.g., an application, browser, etc.).

In some embodiments, an in-product channel refers to a communication channel (e.g., path, connection) within a product (e.g., an application, web interface, GUI, webpage, etc.) that an end-user is actively using and/or actively interacting (e.g., engaging) with. In some embodiments, the communication system 102 is using one or more in-product channels of the product to monitor and track the end-user's engagement with the product. In some embodiments, an out-of-product channel refers to a communication channel outside (e.g., separate from) of a product that an end-user is actively using and/or actively interacting with. For example, an end-user may use a web browser executing on the end-user device 118 to establish a set (e.g., one or more) of connections between the end-user device 118 and a computing device that hosts a webpage. The communication system 102 may monitor the end-user's engagement with the webpage by monitoring one or more connections of the set of connections between the web browser and the computing device hosting the webpage. Responsive to detecting the end-user's interaction with the web browser, the communication system 102 may send an out-of-product message to the end-user by sending an email to the end-user through a set of connections associated with a different product (e.g., other than the web browser).

Figure 7:
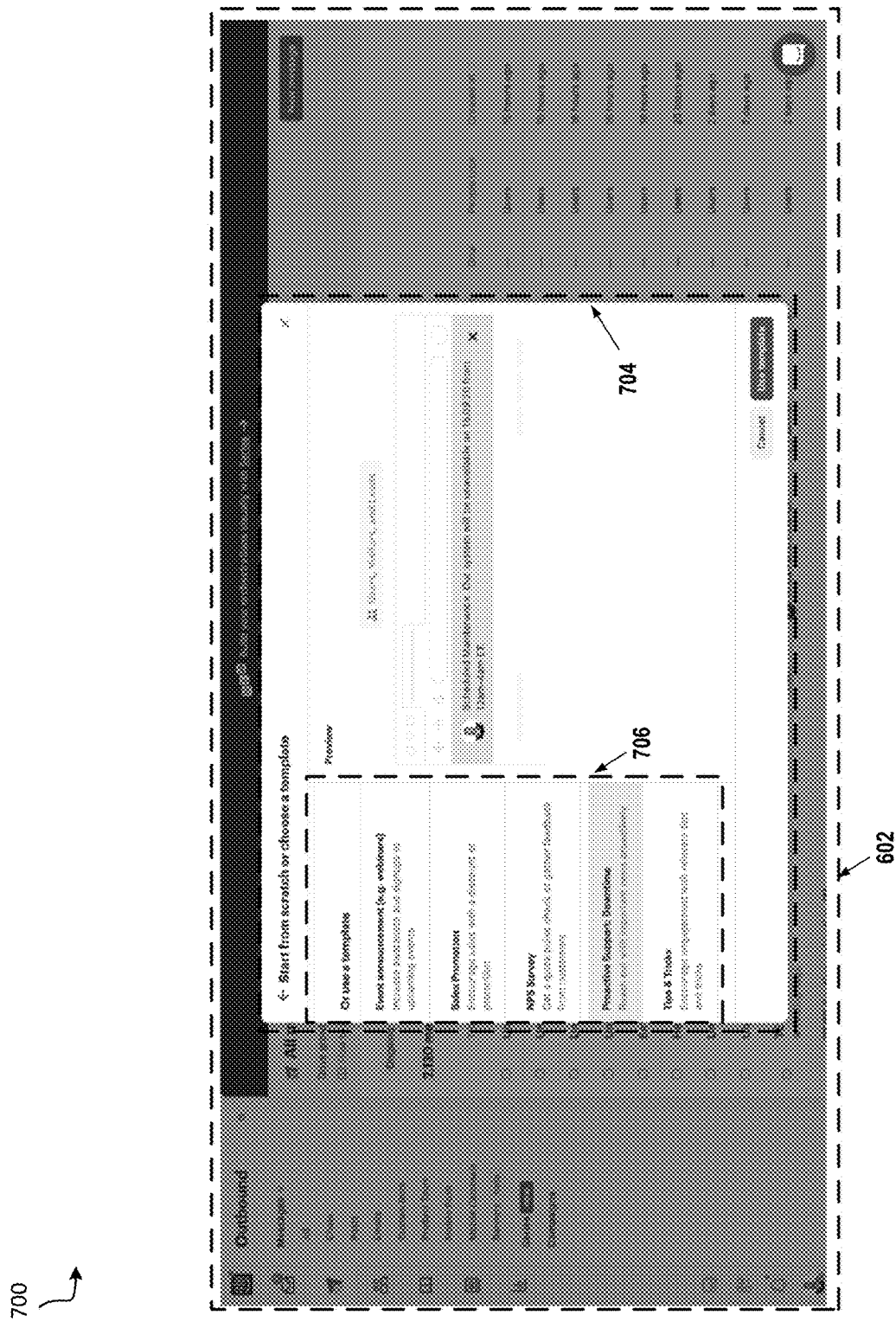
FIG. 7 is a graphical user interface (GUI) of the graphical editor in FIG. 6, according to some embodiments.

FIG. 7 is a graphical user interface (GUI) of the graphical editor in FIG. 6, according to some embodiments. In response to a customer selecting the banner message type 620, the GUI 700 shows a window 704 within the region 602, where the window 704 allows a customer to build a banner message type. The window 704 includes a region 706 that includes a list of selectable templates for building a banner message type. The region 706 includes an Event Announcement template, a Sales Promotion template, an NPS Survey template, a Proactive Support template, and a Tips & Tricks template.

Figure 8:
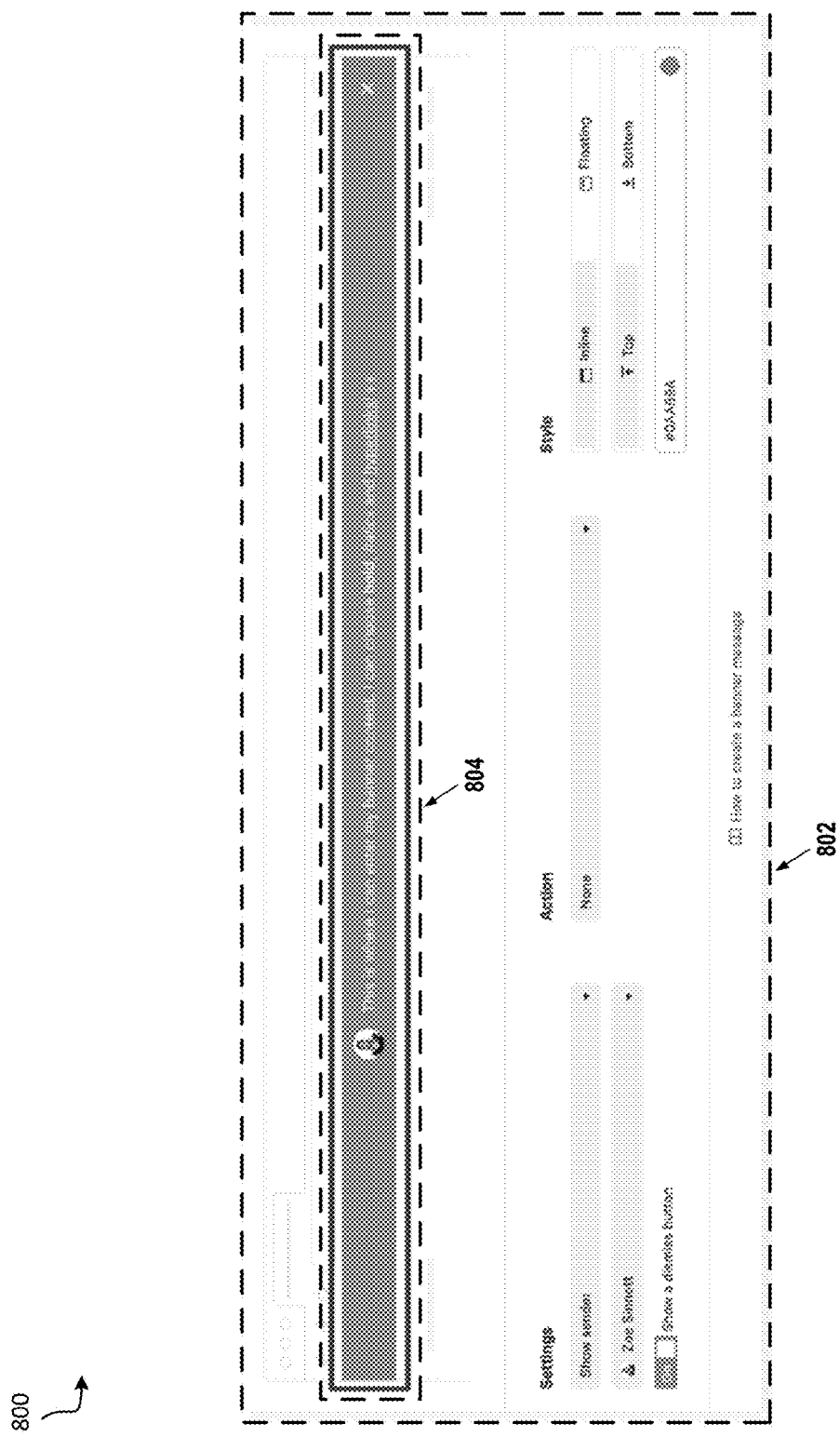
FIGS. 8-12 show various views of the graphical user interface (GUI) of the graphical editor in FIG. 6 for building a banner message type, according to some embodiments.

FIGS. 8-12 show various views of the graphical user interface (GUI) of the graphical editor in FIG. 6 for building a banner message type, according to some embodiments. In response to a customer selecting a template from the list of template in region 706 in FIG. 7, the GUI 700 shows a window 802, where the window 802 allows a customer to build a banner message type. As shown in FIG. 8, the window 802 includes a region 804 that allows a customer to enter one or more content items (e.g., text, pictures, videos, audio, etc.) into a banner message and edit the style (e.g., bolding, italics, hyperlinks, and emojis, etc.) of the one or more contents items. The region 804 shows how a banner message will appear when presented to an end-user.

Figure 9:
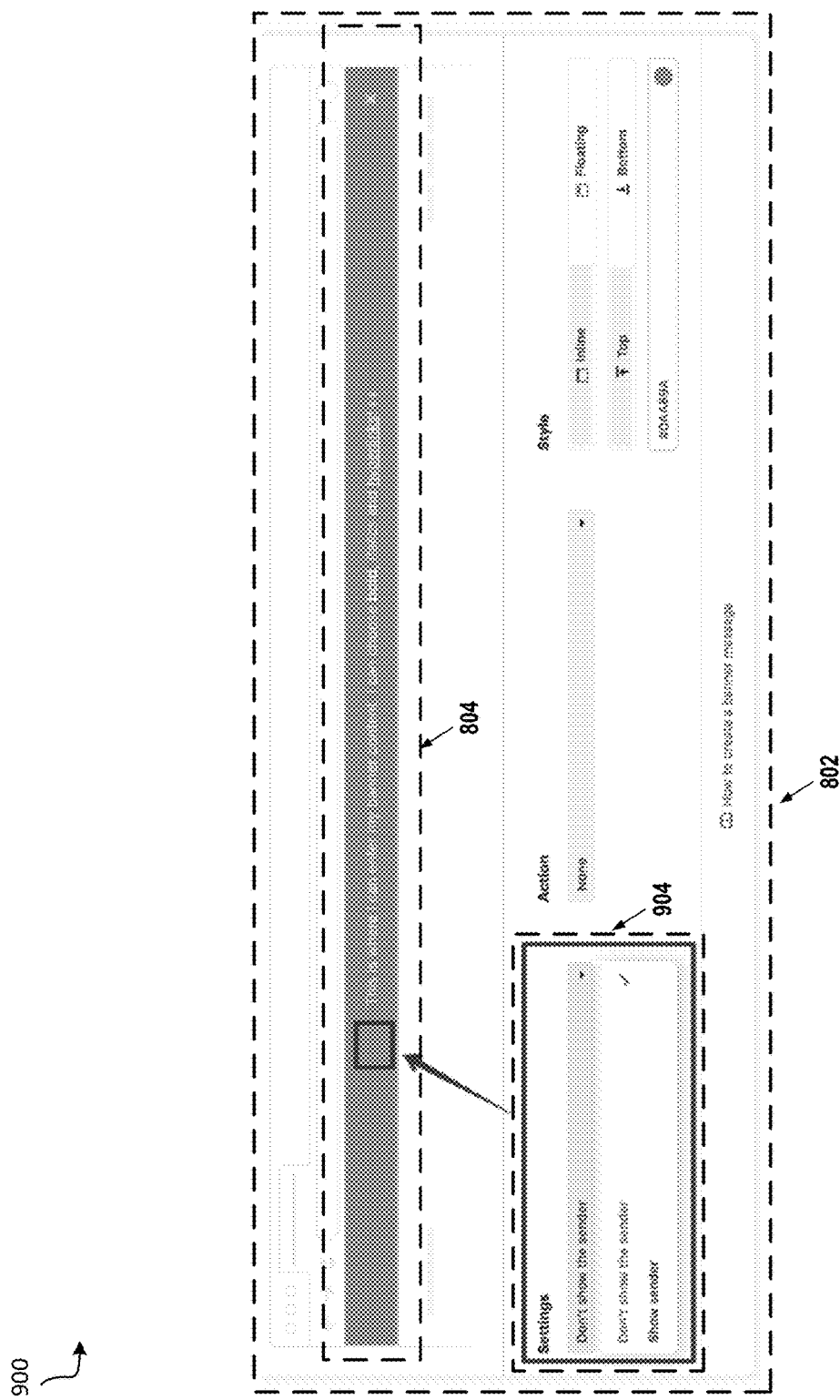

As shown in FIG. 9, the window 802 includes region 904 that allows a customer to select a setting as to whether an icon (e.g., photo, avatar, etc.) identifying the sender (e.g., the customer) of the banner message is included in the banner message that is presented to an end-user.

Figure 10:
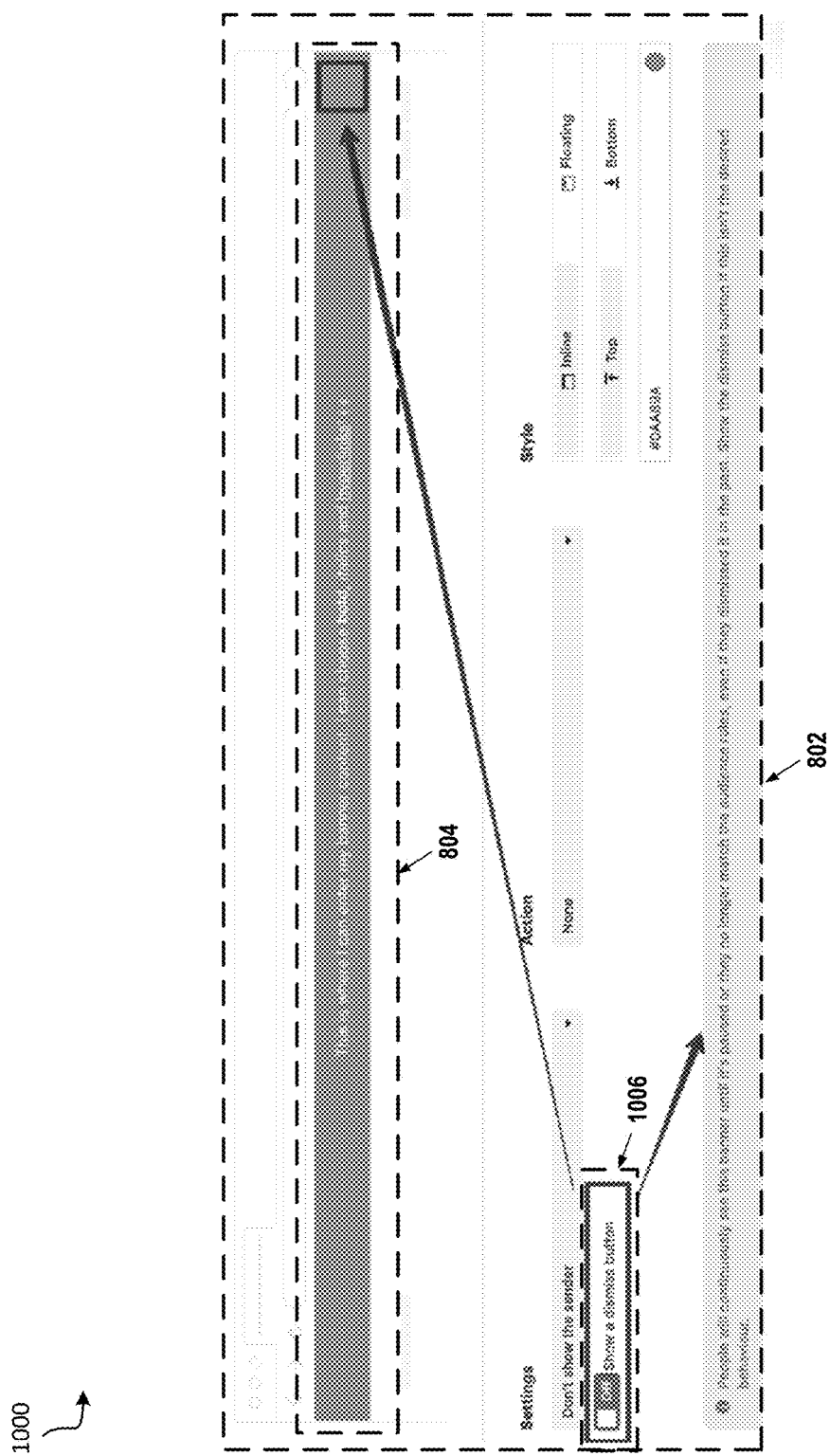

As shown in FIG. 10, the window 802 includes button 1006 that allows a customer to select whether or not an end-user is able to dismiss the banner message.

Figure 11:
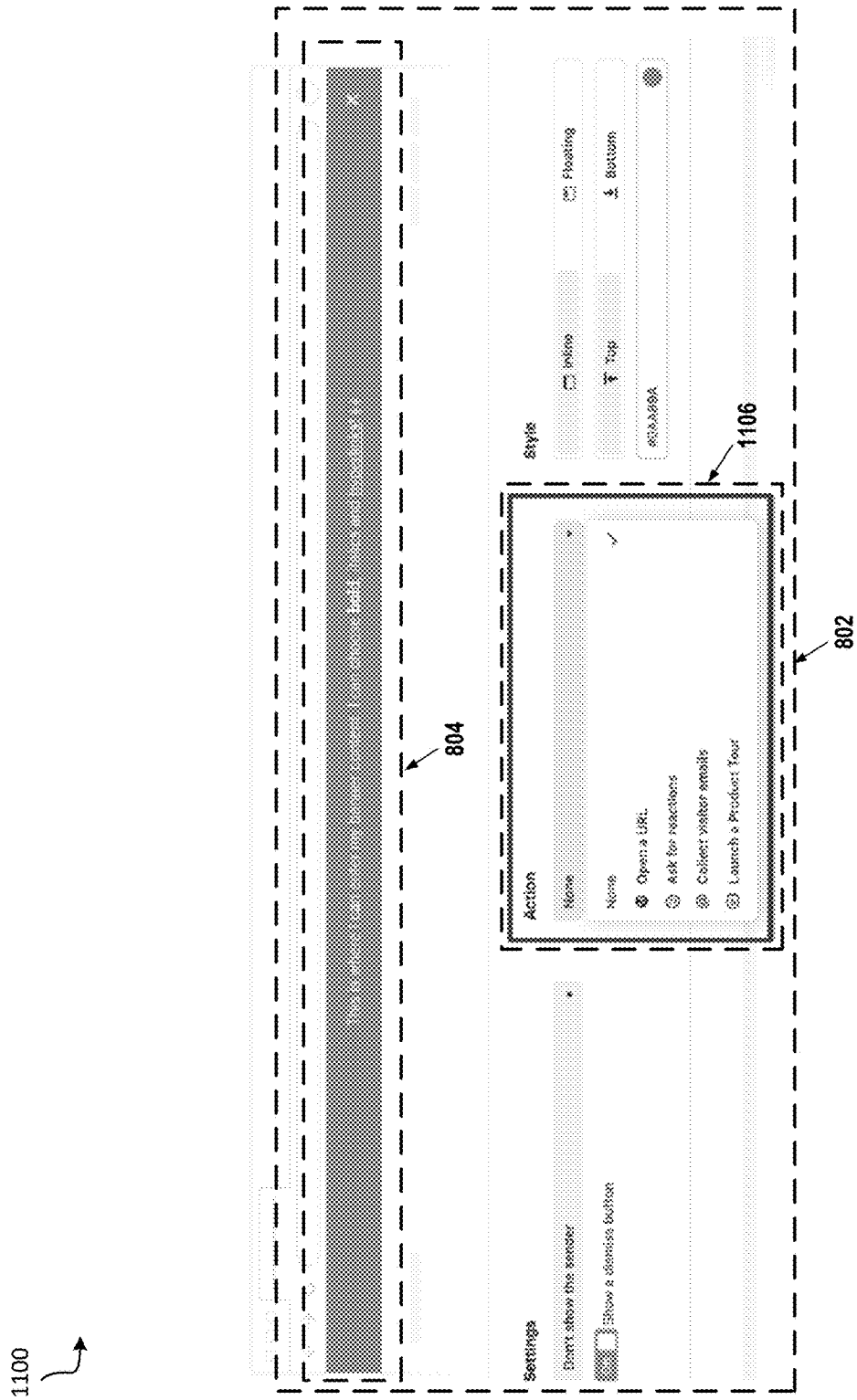

As shown in FIG. 11, the window 802 includes a region 1106 that allows a customer to select whether to add an action: open a URL, ask for emoji reactions, collect visitor emails, or launch a product tour. In some embodiments, only product tours that have a shareable URL enabled can be selected.

Figure 12:
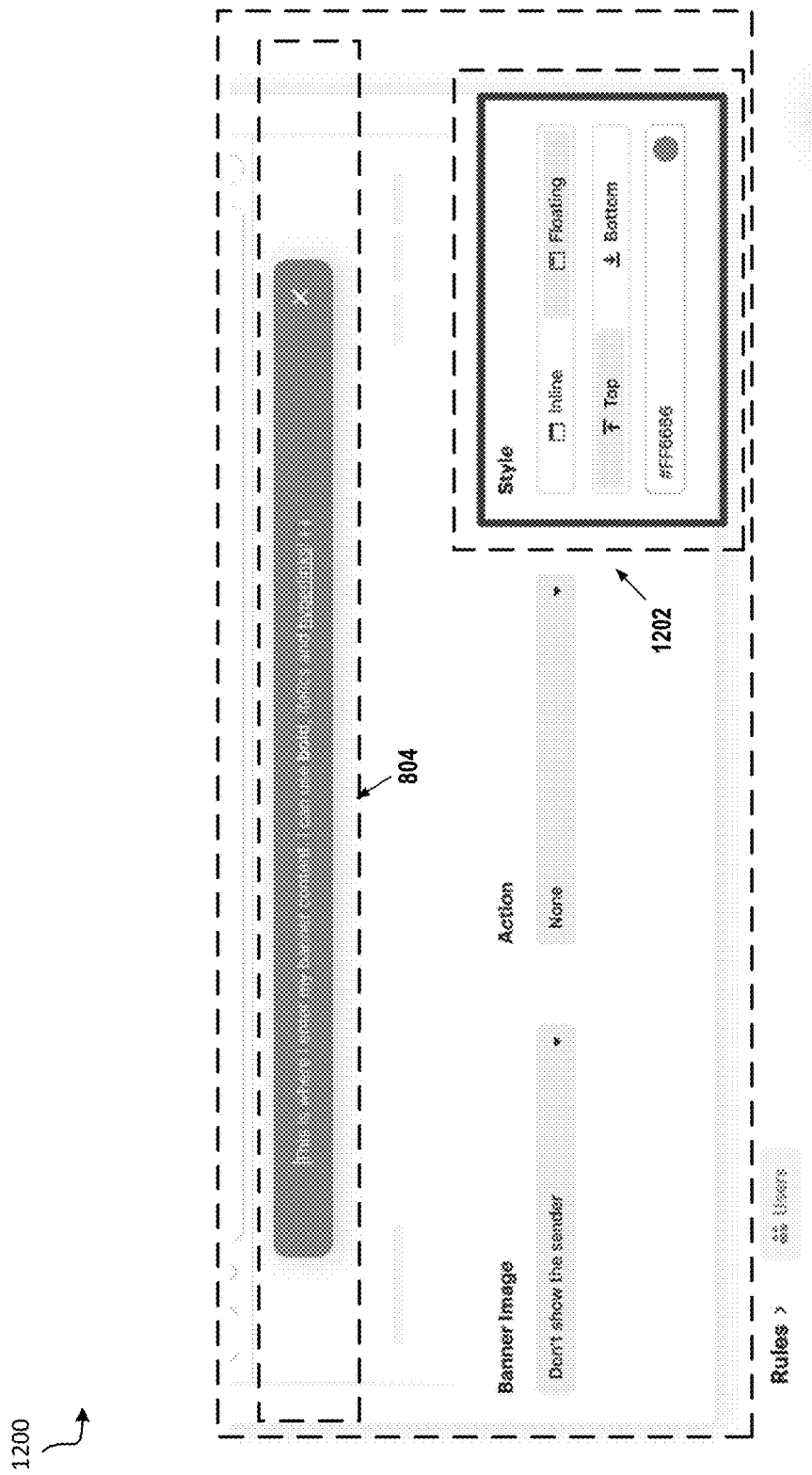

As shown in FIG. 12, the window 802 includes a region 1206 that allows a customer to change the page positioning and background color style. The window 802 also allows a customer to configure a banner message to have any position (e.g., top, bottom, left side, right side) on a user's screen. The window 802 also allows a customer to configure a banner message to have an inline or floating style.

Figure 13:
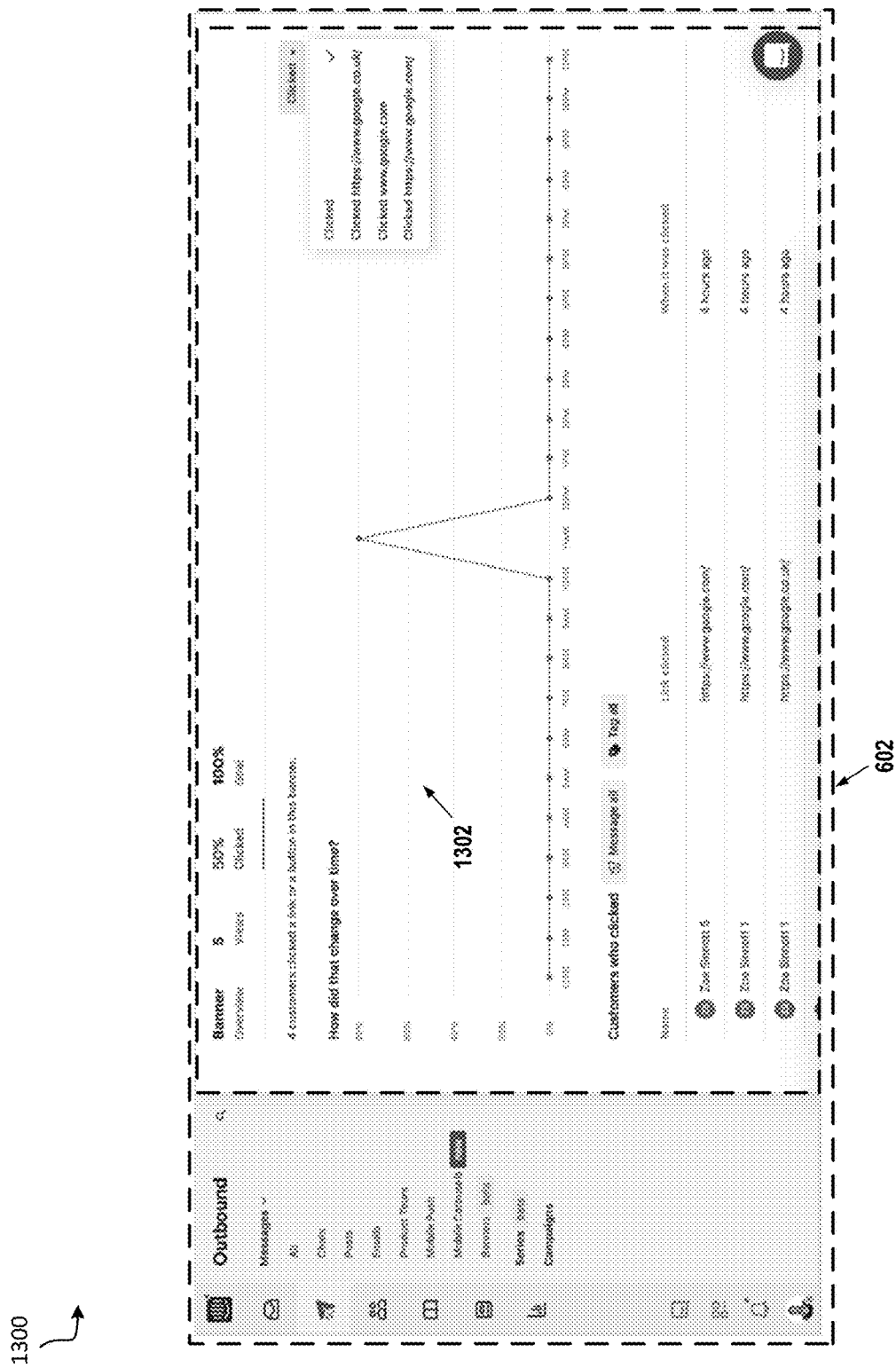
FIG. 13 is a graphical user interface (GUI) of the graphical editor in FIG. 6, according to some embodiments.

FIG. 13 is a graphical user interface (GUI) of the graphical editor in FIG. 6, according to some embodiments. The GUI 1300 shows that the region 602 (sometimes referred to as, "Outbound Home") includes a region 1302 for displaying information (e.g., statistics) about the interactions that one or more end-users have with the links included in one or more banner messages. The communication system 102 may extract the information from the banner messages that are sent to the communication system 102 responsive to one or more end users interacting with the links in the banner messages.

Figure 14B:
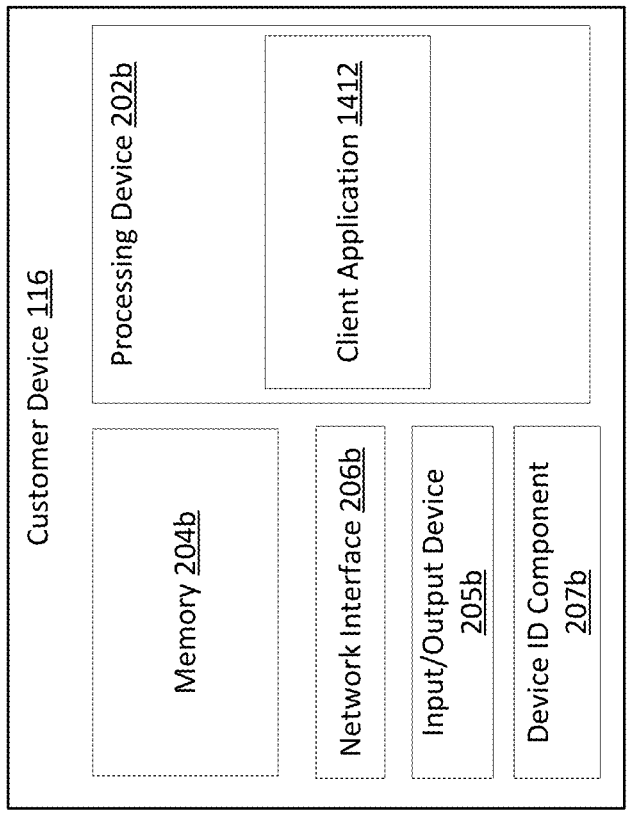
FIG. 14B is a block diagram depicting an example of the customer device 116 in FIG. 1, according to some embodiments.
Figure 14A:
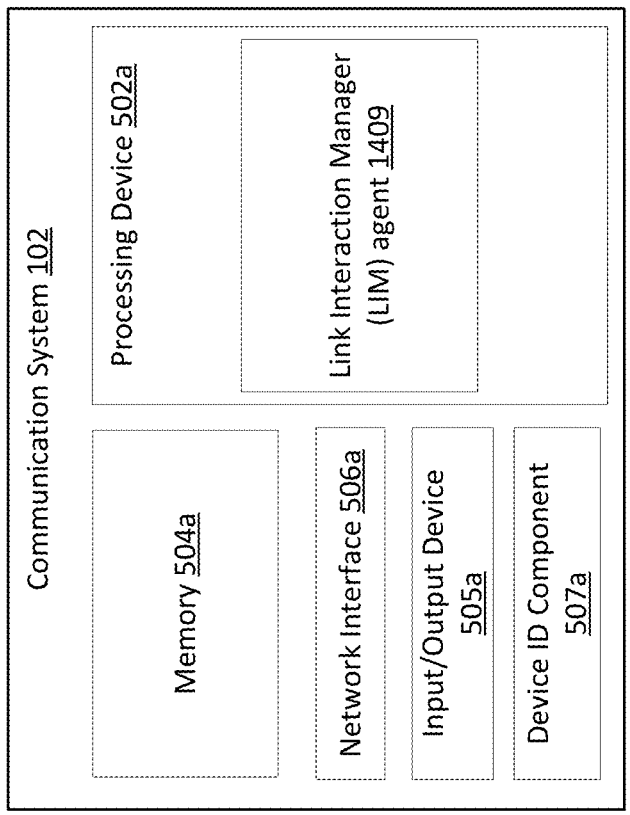
FIG. 14A is a block diagram depicting an example of the communication system 102 in FIG. 1, according to some embodiments.
Figure 22:
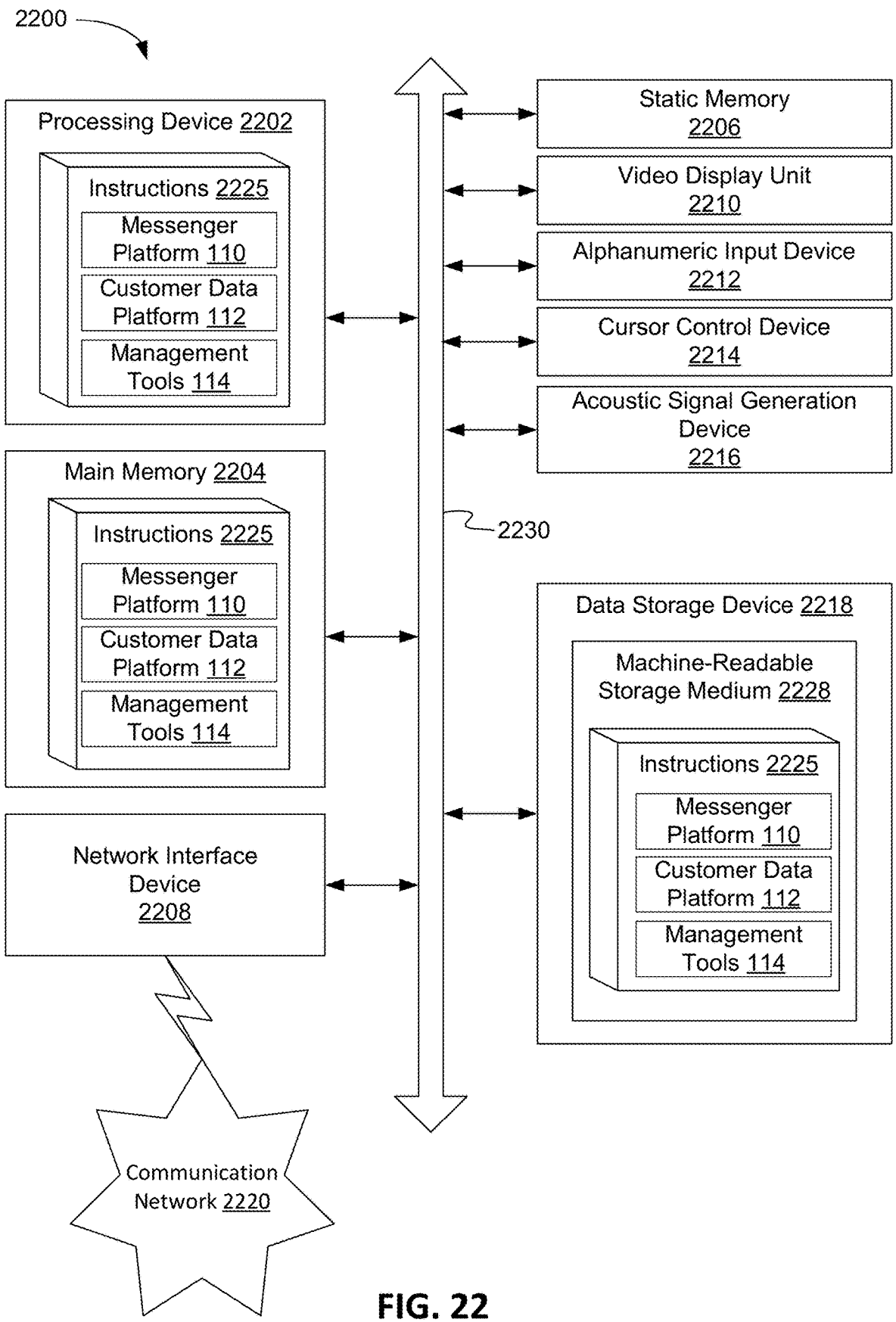
FIG. 22 is a block diagram of an example computing device 2100 that may perform one or more of the operations described herein, in accordance with some embodiments.

FIG. 14A is a block diagram depicting an example of the communication system 102 in FIG. 1, according to some embodiments. While various devices, interfaces, and logic with particular functionality are shown, it should be understood that the communication system 102 includes any number of devices and/or components, interfaces, and logic for facilitating the functions described herein. For example, the activities of multiple devices may be combined as a single device and implemented on a same processing device (e.g., processing device 1402a), as additional devices and/or components with additional functionality are included.

The communication system 102 includes a processing device 1402a (e.g., general purpose processor, a PLD, etc.), which may be composed of one or more processors, and a memory 1404a (e.g., synchronous dynamic random access memory (DRAM), read-only memory (ROM)), which may communicate with each other via a bus (not shown).

The processing device 1402a may be provided by one or more general-purpose processing devices such as a microprocessor, central processing unit, or the like. In some embodiments, processing device 1402a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 1402a may comprise one or more special-purpose processing devices such as an application specific integrated circuit (ASIC), a field programmable gate array (FPGA), a digital signal processor (DSP), network processor, or the like. The processing device 1402a may be configured to execute the operations described herein, in accordance with one or more aspects of the present disclosure, for performing the operations and steps discussed herein.

The memory 1404a (e.g., Random Access Memory (RAM), Read-Only Memory (ROM), Non-volatile RAM (NVRAM), Flash Memory, hard disk storage, optical media, etc.) of processing device 1402a stores data and/or computer instructions/code for facilitating at least some of the various processes described herein. The memory 1404a includes tangible, non-transient volatile memory, or non-volatile memory. The memory 1404a stores programming logic (e.g., instructions/code) that, when executed by the processing device 1402a, controls the operations of the communication system 102. In some embodiments, the processing device 1402a and the memory 1404a form various processing devices and/or circuits described with respect to the communication system 102. The instructions include code from any suitable computer programming language such as, but not limited to, C, C++, C#, Java, JavaScript, VBScript, Perl, HTML, XML, Python, TCL, and Basic.

The processing device 1402a may execute a link interaction manager (LIM) agent 1409 that may be configured to generate a banner message comprising one or more content items. In some embodiments, a content item includes one or more links. In some embodiments, each link of a content item is associated with a respective internet address. In some embodiments, the LIM agent 1409 may be configured to scan a content item to identify at least one link of the one or more links. In some embodiments, the LIM agent 1409 may be configured to extract the at least one link of the one or more links from the banner message. In some embodiments, the LIM agent 1409 may be configured to generate a tracking link based on the extracted link. In some embodiments, the LIM agent 1409 may be configured to generate an updated banner message based on the tracking link. In some embodiments, the LIM agent 1409 may be configured to send the updated banner message to a client device (e.g., customer device 116, end user device 118) to cause the client device to present the updated banner message on a display associated with the client device.

In some embodiments, the LIM agent 1409 may be configured to detect a user interaction with the tracking link of the updated banner message via a user interaction message sent by the client device. In some embodiments, the LIM agent 1409 may be configured to store information associated with the user interaction message in a database.

In some embodiments, the LIM agent 1409 may be configured to redirect, via an internet connection, the client device to an internet address associated with the tracking link of the updated banner message. For example, the client device may establish an internet connection to the internet address using a client application executing on the client device.

In some embodiments, the LIM agent 1409 may be configured to modify (e.g., update) a table associated with the banner message to remove a database constraint associated with the banner message. In some embodiments, the LIM agent 1409 may be configured to modify the table prior to extracting the at least one link of the one or more links of the one or more links from the banner message. In some embodiments, LIM agent 1409 is unable to extract the at least one link of the one or more links of the one or more links from the banner message.

In some embodiments, the LIM agent 1409 may be configured to prevent the generation of duplicate tracking links associated with the duplicate links. For example, a banner message may include a content item that includes a first link associated with an internet address and a second link that is also associated with the internet address. The LIM agent 1409 may determine that the first link and the second link are associated with the same internet address. In response, the LIM agent 1409 may determine to generate only one tracking link associated with the first link and the second link to avoid generating duplicate tracking links.

In some embodiments, the LIM agent 1409 may be configured to prevent the generation of duplicate tracking links associated with the duplicate links by retrieving a message type associated with the banner message, determining that the message type fails to satisfy a predefined criterion; and extracting the at least one link of the one or more links from the banner message using a content bridge associated with the banner message.

In some embodiments, the banner message is communicated via an instant messenger platform instead of an electronic mail platform.

In some embodiments, generating the updated banner message based on the tracking link may include replacing, in the banner message, the extracted link with the tracking link to generate the updated banner message.

In some embodiments, the tracking link includes at least one of an application identifier, an instance type, and an instance identifier.

In some embodiments, the LIM agent 1409 may be configured to encode the instance type and/or the instance type.

The communication system 102 includes a network interface 506a configured to establish a communication session with a computing device for sending and receiving data over the communications network 108 to the computing device. Accordingly, the network interface 506A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the communication system 102 includes a plurality of network interfaces 506a of different types, allowing for connections to a variety of networks, such as local area networks (public or private) or wide area networks including the Internet, via different sub-networks.

The communication system 102 includes an input/output device 505a configured to receive user input from and provide information to a user. In this regard, the input/output device 505a is structured to exchange data, communications, instructions, etc. with an input/output component of the communication system 102. Accordingly, input/output device 505a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of communication system 102, such as a built-in display, touch screen, microphone, etc., or external to the housing of communication system 102, such as a monitor connected to communication system 102, a speaker connected to communication system 102, etc., according to various embodiments. In some embodiments, the communication system 102 includes communication circuitry for facilitating the exchange of data, values, messages, and the like between the input/output device 505a and the components of the communication system 102. In some embodiments, the input/output device 505a includes machine-readable media for facilitating the exchange of information between the input/output device 505a and the components of the communication system 102. In still another embodiment, the input/output device 505a includes any combination of hardware components (e.g., a touchscreen), communication circuitry, and machine-readable media.

The communication system 102 includes a device identification component 507a (shown in FIG. 14A as device ID component 507a) configured to generate and/or manage a device identifier associated with the communication system 102. The device identifier may include any type and form of identification used to distinguish the communication system 102 from other computing devices. In some embodiments, to preserve privacy, the device identifier may be cryptographically generated, encrypted, or otherwise obfuscated by any device and/or component of communication system 102. In some embodiments, the communication system 102 may include the device identifier in any communication (e.g., a message that includes the container image request, etc.) that the communication system 102 sends to a computing device.

The communication system 102 includes a bus (not shown), such as an address/data bus or other communication mechanism for communicating information, which interconnects the devices and/or components of communication system 102, such as processing device 502a, network interface 506a, input/output device 505a, and device ID component 507a.

In some embodiments, some or all of the devices and/or components of communication system 102 may be implemented with the processing device 502a. For example, the communication system 102 may be implemented as a software application stored within the memory 504a and executed by the processing device 502a. Accordingly, such embodiment can be implemented with minimal or no additional hardware costs. In some embodiments, any of these above-recited devices and/or components rely on dedicated hardware specifically configured for performing operations of the devices and/or components.

FIG. 14B is a block diagram depicting an example of the customer device 116 of the environment in FIG. 1, according to some embodiments. While various devices, interfaces, and logic with particular functionality are shown, it should be understood that the customer device 116 includes any number of devices and/or components, interfaces, and logic for facilitating the functions described herein. For example, the activities of multiple devices may be combined as a single device and implemented on a same processing device (e.g., processing device 1402b), as additional devices and/or components with additional functionality are included.

The customer device 116 includes a processing device 1402b (e.g., general purpose processor, a PLD, etc.), which may be composed of one or more processors, and a memory 1404b (e.g., synchronous dynamic random access memory (DRAM), read-only memory (ROM)), which may communicate with each other via a bus (not shown). The processing device 1402b includes identical or nearly identical functionality as processing device 1402a in FIG. 14a, but with respect to devices and/or components of the customer device 116 instead of devices and/or components of the communication system 102.

The memory 1404b of processing device 1402b stores data and/or computer instructions/code for facilitating at least some of the various processes described herein. The memory 1404b includes identical or nearly identical functionality as memory 1404a in FIG. 14A, but with respect to devices and/or components of the customer device 116 instead of devices and/or components of the communication system 102.

The processing device 1402b may be configured to include and/or execute a client application 1412 that is displayed on a computer screen of the communication system 102. In some embodiments, the client application 1412 may be configured to receive an updated banner message from the communication system 102. In some embodiments, the client application 1412 may be configured to present the updated banner message on a display associated with the client device of the client application 1412.

The client application 1412 may be configured to detect that a user of the client device interacted with a tracking link of the updated banner message. A user action may include, for example, hovering a mouser cursor of the client device over the link, clicking on the link with a mouse cursor or keyboard stroke, a voice command from the user that identifies the link, etc. In response to detecting the user interaction with the link, the client application 1412 may send a message (sometimes referred as, user interaction message) to the communication system 102 to notify the communication system 102 that the user interacted with the link.

The customer device 116 includes a network interface 1406b configured to establish a communication session with a computing device for sending and receiving data over a network to the computing device. Accordingly, the network interface 1406b includes identical or nearly identical functionality as network interface 1406a in FIG. 14A, but with respect to devices and/or components of the customer device 116 instead of devices and/or components of the communication system 102.

The customer device 116 includes an input/output device 1405b configured to receive user input from and provide information to a user. In this regard, the input/output device 1405b is structured to exchange data, communications, instructions, etc. with an input/output component of the customer device 116. The input/output device 1405b includes identical or nearly identical functionality as input/output processor 1405a in FIG. 14A, but with respect to devices and/or components of the customer device 116 instead of devices and/or components of the communication system 102.

The customer device 116 includes a device identification component 1407b (shown in FIG. 14B as device ID component 1407b) configured to generate and/or manage a device identifier associated with the customer device 116. The device ID component 1407b includes identical or nearly identical functionality as device ID component 1407a in FIG. 14A, but with respect to devices and/or components of the customer device 116 instead of devices and/or components of the communication system 102.

The customer device 116 includes a bus (not shown), such as an address/data bus or other communication mechanism for communicating information, which interconnects the devices and/or components of the customer device 116, such as processing device 1402b, network interface 1406b, input/output device 1405b, and device ID component 1407b.

In some embodiments, some or all of the devices and/or components of customer device 116 may be implemented with the processing device 1402b. For example, the customer device 116 may be implemented as a software application stored within the memory 1404b and executed by the processing device 1402b. Accordingly, such embodiment can be implemented with minimal or no additional hardware costs. In some embodiments, any of these above-recited devices and/or components rely on dedicated hardware specifically configured for performing operations of the devices and/or components.

FIG. 15 is a table depicting a Banner data model of action metadata for banner messages, according to some embodiments. The table 1500 includes a plurality of keys that are associated with one or more banner messages. Each key is associated with a type and a description.

FIGS. 16A-B is a table depicting a LocalizedBannerContent data model of action metadata for banner messages, according to some embodiments. The table 1600 includes a plurality of keys that are associated with one or more banner messages. Each key is associated with a type and a description.

A customer may build (e.g., generate, create) and/or configure (e.g., configure) a banner message by using the graphical user interfaces of FIGS. 2-12. The customer device 116 sends the configurations for the banner message to the communication system 102, which stores the configurations in the customer data platform 112 in the data model format shown in FIG. 15 and/or the data model format shown in FIG. 16 FIGS. 16A-B. The communication system 102 may be configured to retrieve the one or more keys (and the type and description associated with each key) associated with a banner message from the customer data platform 112. The communication system 102 may be configured to generate a banner message based on the retrieved keys. The communication system 102 may be configured to present the banner message to the end user. As shown, the data model stores information about the banner message using a key format, instead of a hash format.

FIG. 17 is a table depicting a BannerView data model used as the instance when recording statistics and tracking the current dismissal state of a banner message, according to some embodiments. The table 1700 includes a plurality of keys that are associated with one or more banner messages. Each key is associated with a type and a description. The communication system 102 may be configured to receive end user interaction messages from an end-user device 118 responsive to an end user of the end-user device 118 interacting with a link in a banner message. The communication system 102 may be configured to generate statistics about the end user interactions with links based on the end user interaction messages and other information stored in the customer data platform 112. The communication system 102 may be configured to store the statistics as one or more keys in the BannerView data model in the customer data platform 112. The communication system 102 may be configured to retrieve the one or more keys (and the type and description associated with each key) associated with the statistics from the customer data platform 112 and generate the graphs shown in region 1302 of FIG. 13.

3. Overview of Managing Links for Tracking Interactions with Banner Messages

At least one of the main goals of the one or more embodiments of the present disclosure is to extract links without a substitute message and track link clicks without a conversation.

As used herein, a "block" may refer to a code or text only (e.g., JSON) representation of the content of a banner message. A "chat" may refer to a message that appears in within a product (e.g., the application that the user is using to walk through a workflow, user path, or series) as a chat bubble. A "content link" may refer to a link extracted from the blocks of a banner message. A "conversation" may refer to a user specific instance of a banner message that appears with a product (e.g., Messenger) to the end user and to the customers (e.g., team mates). A "Message" (with a capital M) may refer to a legacy data model that includes both the audience and the content of a banner message. A "post" may refer to a message that appears within a product as a center of screen modal. A substitute message may refer to a Message (capital M) created by a chat, post or email to satisfy the requirements of the ConversationsService for conversation creation.

One or more of the following requirements are addressed by one or more of the embodiments of the present disclosure for managing links for tracking interactions with banner messages: (1) When viewing the click stats associated with a banner message, a customer may want to see the links that each end-user clicked in the banner message; (2) When viewing the click stats associated with a banner message, a customer may want to be able to see all the end-users that clicked on a particular link; (3) When viewing the click stats associated with a banner message, a customer may want to be able to see the number of end-users that click each link; (4) the click states associated with a banner message should behave and work consistently with those of chats, posts, and emails; and (5) The solution for banner message should not be specific to banner message (i.e., The solution should allow us a customer to introduce click stats for tours and/or to remove the reliance on substitute messages for click stats for chats, posts, and emails.)

For banner messages, the communication system 102 is configured to display to customers (e.g., teammates) what links have been clicked on by end-users. In some embodiments, the communication system 102 may use the same process it uses to manage link tracking for other content types (e.g., chats, posts, email).

The communication system 102 may be configured to manage links for tracking user interactions with banner messages according to a link extraction phase, a link rendering phase, and a click tracking phase. To perform the link extraction phase, the communication system 102 is configured to extract one or more links from block associated with a banner message. To perform the link rendering phase, the communication system 102 is configured to generate one or more tracking links that are specific to the customer and the link for when a banner message is rendered. To perform the click tracking phase, the communication system 102 is configured to detect (e.g., sense) when an end-user interacts (e.g., clicks, hovers a mouse over, etc.) with a link of a banner message. The communication system 102 is configured to monitor (e.g., trace, track) and record (e.g., log) the interaction in the customer data platform 112. The communication system 102 is configured to generate one or more statistics (e.g., count, average, min, max, quartiles, click rate, etc.) associated with the interaction and other interactions that are already stored in the customer data platform 112.

4. Managing Links for Tracking Interactions with Chats, Posts, and Email 4.1 Link Extraction The communication system 102, the customer device 116, and/or the end user device 118 may be configured to perform any of the operations of the link extraction phase, as discussed herein:

When a chat, post or email is updated, the communication system 102 may be configured to update the substitute message's MessageVariation using the MessageVariation::Update command. This command calls the MessageVariation::ExtractLinks command which identifies the links in the blocks and creates a ContentLink row for each, where one does not already exist.

FIG. 18 is a table depicting a ContentLink data model used as the instance when storing information (e.g., links, block information, etc.) associated with information (e.g., links, entity type, etc.) extracted from blocks of chats, posts, and email, according to some embodiments. The table 1800 includes a plurality of keys that are associated with one or more blocks of chats, posts, and email. Each key is associated with a type and a description.

FIG. 19 is a table depicting various options for how the communication system 102 may index (e.g., search, scan) the ContentLink data model in FIG. 18, according to some embodiments. As shown, the communication system 102 may index the ContentLink data model based on app_id, entity_type, entity_id. The communication system 102 may index the ContentLink data model based on app_id, message_variation_id. The communication system 102 may index the ContentLink data model based message_variation_id.

4.2 Link Rendering

The communication system 102, the customer device 116, and/or the end user device 118 may be configured to perform any of the operations of the link rendering phase, as discussed herein:

When rendering blocks for customers, the communication system 102 may be configured to specify a click_tracking_id and a set of click_tracking_links as options on the RenderableContent. These may serve as inputs to the block rendering transformations.

The TrackingLinkId to annotate (e.g., mark) one or more of the links in the blocks with the content link ID (sometimes referred to as the tracking link ID in that code).

The click tracking transformations (whether EmailClickTrackingTransformation, InappClickTrackingTransformation or MobileClickTrackingTransformation) transform the block, using the ClickAndOpenURLGeneration module (of the communication system 102, the customer device 116, and/or the end user device 118) to generate the link tracking URL. The arguments taken to generate the link tracking URL include one or more of the following: App ID Code, To Track ID (the Conversion ID), URL, the customer tracking domain (for emails, to ensure domain reputation separation), and the Tracking Link ID (the Content Link ID).

The ClickAndOpenURLGeneration module (of the communication system 102, the customer device 116, and/or the end user device 118) generates a URL that is specific to the conversation and content link, hence uniquely identifying both the customer and the content link clicked when used. It also includes a HMAC to verify the link has not been tampered with.

In some embodiments, the mobile SDKs may parse out the URLs from the tracking links and do the click tracking request in the background while executing the request to the target URL in the foreground.

4.3 Click Tracking

The communication system 102, the customer device 116, and/or the end user device 118 may be configured to perform any of the operations of the click tracking phase, as discussed herein:

When a link is clicked, it is handled by the MessageClicksAndOpensController (of the communication system 102, the customer device 116, and/or the end user device 118). There are three query parameters that are handled: h, URL, and, l.

h: —The HMAC and the Conversation ID, separated by '-'.

URL: —The escaped URL to redirect to.

l: —Tracking Link HMAC and Tracking Link ID, separated by '-'.

The customer is redirected to the URL and the recording of the click tracking is enqueued onto the ClickTrackingWorker (via Sidekiq). The ClickTrackingWorker uses MessageDelivery::Deliverability::Tracking::ClickAndOpenTracking.track_click to find the conversation and then record the click using the ContentService::Commands::RecordClick command. The RecordClick command records into the StatsSystem if a LocalizedContentBridge is present and otherwise records into the legacy MessageEvents table.

5. Embodiment(s) of Managing Links for Tracking Interactions with Banner Messages There were two main technical obstacles to be solved. First, the ExtractLinks command takes a MessageVariation as an input which a banner message does not have. Second, the tracking links generated assume that the To Track ID/Click Tracking ID will always be a Conversation ID.

At a high level, in some embodiments, the solution is for the communication system 102 to modify the ExtractLinks command so that it can take a localized banner/chat/post/email content object or a MessageVariation as the input, and encode the instance type and/or the instance ID when generating the click tracking links.

5.1 Link Extraction

The communication system 102, the customer device 116, and/or the end user device 118 may be configured to perform any of the operations of the link extraction phase, as discussed herein:

Banner message do not include substitute messages. As such, the ContentLink table has been modified by the communication system 102 to remove the DB constraint that the message_variation_id cannot be null. For example, FIG. 20 is a table depicting a modified ContentLink data model used as the instance when storing information (e.g., links, block information, etc.) associated with information (e.g., links, entity type, etc.) extracted from blocks of chats, posts, and email, according to some embodiments. The table 2000 includes a plurality of keys that are associated with one or more blocks of chats, posts, and email. Each key is associated with a type and a description.

The communication system 102 may modify the existing ExtractLinks command to move it to the ContentService and change the arguments to: App, Entity, and Message Variation. In some embodiments, the communication system 102 may remove the Entity from the arguments if the message variation is specified. In some embodiments, the communication system 102 may remove the Message Variation from the arguments if the Entity is specified.

When an Entity (e.g., a localized banner/chat/post/email content object) is specified, the communication system 102 may now retrieve the existing content links from it. When it is not, the communication system 102 may use the message variation's localized content bridge to retrieve it. Similarly, if the message variation is not specified, the communication system 102 may use the entity's localized content bridge to retrieve it to ensure that the communication system 102 does not create duplicate content links. The communication system 102 is then able to use the newly modified ExtractLinks command for banners messages, as well as for Chats, Posts, and Emails.

5.2 Link Rendering

The communication system 102, the customer device 116, and/or the end user device 118 may be configured to perform any of the operations of the link rendering phase, as discussed herein:

Previously there were two options that had to be set on block rendering for click tracking: click_tracking_id and click_tracking_links.

These two options have been replaced with a new ClickTrackingOptions object that represent the same things, with one or more of the following attributes: App, Instance Type, Instance ID, and Content Links Banners::Messenger::Serializers::LocalizedBannerContent was modified (e.g., by the communication system 102) to construct this object and set it as an option on the RenderableContent.

ClickAndOpenTracking was modified to generate URLs that include the instance type as well as the instance ID. Previously, the tracking token used was the app ID and the conversation ID, separated by an "_". The new tracking token is the app ID, the instance type and the instance ID with the instance type and instance type separated by an ":".

The effect of this was that old tracking fragment format of "hmac-app_id_code_conversation_id" is changed to a new tracking format of "hmac-app_id_code_instance_type:instance_id".

5.3 Click Tracking

The communication system 102, the customer device 116, and/or the end user device 118 may be configured to perform any of the operations of the click tracking phase, as discussed herein:

Previously there were two options that had to be set on block rendering for click tracking: click_tracking_id and click_tracking_links.

ClickAndOpenTracking was modified so that it parses out the instance type from the tracking fragment and uses that to retrieve the correct instance rather than assuming the instance will be a Conversation. Similarly, the RecordClick command it employs was modified to take an instance argument instead of a Conversation argument.

FIG. 21 is a flow diagram depicting a method of managing links for tracking user interactions with content items, according to some embodiments. Method 2100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 2100 may be performed by one or more host machines, such as host machines 104 in FIG. 1. In some embodiments, method 400 may be performed by a cloud service system, such as cloud service system 114 in FIG. 1.

With reference to FIG. 21, method 2100 illustrates example functions used by various embodiments. Although specific function blocks ("blocks") are disclosed in method 2100, such blocks are examples. That is, embodiments are well suited to performing various other blocks or variations of the blocks recited in method 2100. It is appreciated that the blocks in method 2100 may be performed in an order different than presented, and that not all of the blocks in method 2100 may be performed.

As shown in FIG. 21, the method 2100 includes the block 402 of generating a banner message comprising a content item, wherein the content item comprises one or more links, each link associated with a respective internet address. The method 2100 includes the block 2104 of scanning the content item to identify at least one link of the one or more links. The method 2100 includes the block 2106 of extracting the at least one link of the one or more links from the banner message. The method 2100 includes the block 2108 of generating a tracking link based on the extracted link. The method 2100 includes the block 2110 of generating, by a processing device, an updated banner message based on the tracking link. The method 2100 includes the block 2112 of sending the updated banner message to a client device to cause the client device to present the updated banner message on a display associated with the client device.

FIG. 21 is a block diagram of an example computing device 2200 that may perform one or more of the operations described herein, in accordance with some embodiments. Computing device 2200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 2200 may include a processing device (e.g., a general purpose processor, a PLD, etc.) 2002, a main memory 2004 (e.g., synchronous dynamic random access memory (DRAM), read-only memory (ROM)), a static memory 2206 (e.g., flash memory and a data storage device 2218), which may communicate with each other via a bus 2230.

Processing device 2202 may be provided by one or more general-purpose processing devices such as a microprocessor, central processing unit, or the like. In an illustrative example, processing device 2202 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 2202 may comprise one or more special-purpose processing devices such as an application specific integrated circuit (ASIC), a field programmable gate array (FPGA), a digital signal processor (DSP), network processor, or the like. The processing device 2202 may be configured to execute the operations described herein, in accordance with one or more aspects of the present disclosure, for performing the operations and steps discussed herein.

Computing device 2200 may further include a network interface device 2208 which may communicate with a communication network 2220. The computing device 2200 also may include a video display unit 2210 (e.g., a liquid crystal display (LCD) or a cathode ray tube (CRT)), an alphanumeric input device 2212 (e.g., a keyboard), a cursor control device 2214 (e.g., a mouse) and an acoustic signal generation device 2216 (e.g., a speaker). In one embodiment, video display unit 2210, alphanumeric input device 2212, and cursor control device 2214 may be combined into a single component or device (e.g., an LCD touch screen).

Data storage device 2218 may include a computer-readable storage medium 2228 on which may be stored one or more sets of instructions 2225 that may include instructions for one or more components (e.g., messenger platform 110, the customer data platform 112, and the management tools 114) for carrying out the operations described herein, in accordance with one or more aspects of the present disclosure. Instructions 2225 may also reside, completely or at least partially, within main memory 2204 and/or within processing device 2202 during execution thereof by computing device 2200, main memory 2204 and processing device 2202 also constituting computer-readable media. The instructions 2225 may further be transmitted or received over a communication network 2220 via network interface device 2208.

While computer-readable storage medium 2228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "scanning," "extracting," "sending," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein may relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. The terms "comprises", "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
    generating a banner message comprising a content item, wherein the content item comprises one or more links, each link associated with a respective internet address;
    scanning the content item to identify at least one link of the one or more links;
    modifying a table associated with the banner message to remove a database constraint associated with the banner message;
    extracting the at least one link of the one or more links from the banner message;
    generating a tracking link based on the extracted link;
    generating, by a processing device, an updated banner message based on the tracking link; and
    sending the updated banner message to a client device to cause the client device to present the updated banner message on a display associated with the client device.

2. The method of claim 1, further comprising:
    detecting a user interaction with the tracking link of the updated banner message via a user interaction message sent by the client device; and
    storing information associated with the user interaction message in a database.

3. The method of claim 2, further comprising:
    redirecting, via an internet connection, the client device to an internet address associated with the tracking link of the updated banner message.

4. The method of claim 1, wherein the one or more links comprises duplicate links, and further comprising:
    preventing a generation of duplicate tracking links associated with the duplicate links.

5. The method of claim 1, wherein preventing the generation of the duplicate tracking links associated with the duplicate links comprises:
    retrieving a message type associated with the banner message;
    determining that the message type fails to satisfy a predefined criterion; and
    extracting the at least one link of the one or more links from the banner message using a content bridge associated with the banner message.

6. The method of claim 1, wherein the banner message is communicated via an instant messenger platform instead of an electronic mail platform.

7. The method of claim 1, wherein generating the updated banner message based on the tracking link comprises:
    replacing, in the banner message, the extracted link with the tracking link to generate the updated banner message.

8. The method of claim 1, wherein the tracking link comprises at least one of an application identifier, an instance type, and or an instance identifier.

9. The method of claim 8, further comprising:
    encoding the instance type and the instance identifier.

10. A system comprising:
    a memory; and
    a processing device, operatively coupled to the memory, to:
        generate a banner message comprising a content item, wherein the content item comprises one or more links, each link associated with a respective internet address;
        scan the content item to identify at least one link of the one or more links;
        modify a table associated with the banner message to remove a database constraint associated with the banner message;
        extract the at least one link of the one or more links from the banner message;
        generate a tracking link based on the extracted link;
        generate an updated banner message based on the tracking link; and send the updated banner message to a client device to cause the client device to present the updated banner message on a display associated with the client device.

11. The system of claim 10, wherein the processing device further to:
    detect a user interaction with the tracking link of the updated banner message via a user interaction message sent by the client device; and
    store information associated with the user interaction message in a database.

12. The system of claim 11, wherein the processing device further to:
    redirect, via an internet connection, the client device to an internet address associated with the tracking link of the updated banner message.

13. The system of claim 10, wherein the one or more links comprises duplicate links, and wherein the processing device further to:
    prevent a generation of duplicate tracking links associated with the duplicate links.

14. The system of claim 10, to prevent the generation of the duplicate tracking links associated with the duplicate links the processing device to:
    retrieve a message type associated with the banner message;
    determine that the message type fails to satisfy a predefined criterion; and
    extract the at least one link of the one or more links from the banner message using a content bridge associated with the banner message.

15. The system of claim 10, wherein the banner message is communicated via an instant messenger platform instead of an electronic mail platform.

16. The system of claim 10, wherein to generate the updated banner message based on the tracking link the processing device to:
    replace, in the banner message, the extracted link with the tracking link to generate the updated banner message.

17. The system of claim 10, wherein the tracking link comprises at least one of an application identifier, an instance type, or an instance identifier.

18. A non-transitory computer-readable medium storing instructions that, when execute by a processing device, cause the processing device to:
    generate, by the processing device, a banner message comprising a content item, wherein the content item comprises one or more links, each link associated with a respective internet address;
    scan the content item to identify at least one link of the one or more links;
    modify a table associated with the banner message to remove a database constraint associated with the banner message;
    extract the at least one link of the one or more links from the banner message;
    generate a tracking link based on the extracted link;
    generate, by the processing device, an updated banner message based on the tracking link; and
    send the updated banner message to a client device to cause the client device to present the updated banner message on a display associated with the client device.

* * * * *